United States Patent
Huang et al.

(10) Patent No.: US 8,929,388 B2
(45) Date of Patent: Jan. 6, 2015

(54) SYSTEMS AND METHODS FOR RESOURCE ALLOCATION SERVING COMMUNICATION REQUIREMENTS AND FAIRNESS

(71) Applicant: QUALCOMM Incorporated, San Diego, CA (US)

(72) Inventors: Xiaolong Huang, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/787,192

(22) Filed: Mar. 6, 2013

(65) Prior Publication Data

US 2013/0182565 A1 Jul. 18, 2013

Related U.S. Application Data

(62) Division of application No. 12/684,577, filed on Jan. 8, 2010, now Pat. No. 8,451,862.

(60) Provisional application No. 61/225,599, filed on Jul. 15, 2009.

(51) Int. Cl.
*H04L 12/413* (2006.01)
*H04B 7/212* (2006.01)
*H04W 72/04* (2009.01)
*H04W 72/02* (2009.01)
*H04W 74/08* (2009.01)

(52) U.S. Cl.
CPC ...... *H04W 72/0486* (2013.01); *H04W 72/0446* (2013.01); *H04W 72/02* (2013.01); *H04W 74/08* (2013.01)
USPC .......................................... 370/447; 370/337

(58) Field of Classification Search
CPC .......................... H04W 72/0486; H04W 72/04
USPC ................. 370/468, 321, 329, 337, 341, 347, 370/395.21, 395.4, 431, 433, 442, 447, 450, 370/459, 461, 462, 463
See application file for complete search history.

(56) References Cited

U.S. PATENT DOCUMENTS 6,665,301 B1   12/2003   Wu
(Continued)

FOREIGN PATENT DOCUMENTS

CN   1650578 A   8/2005
(Continued)

OTHER PUBLICATIONS

Kangawa, T., "Multi-cell Scheduling for QoS Control in CDMA/TDD Systems," Technical Report of the Institute of Electronics, Information and Communication Engineers, vol. 104, No. 681 (MoMuC 2004-107 to 148), The Institute of Electronics, Information and Communication Engineers, Feb. 23, 2005: 83-88, ISSN: 0913-5685.

(Continued)

*Primary Examiner* — Hanh N Nguyen

(57) ABSTRACT

An allocation technique is operable to allocate communication resources in multi-hop networks under the joint consideration of communication requirements and fairness. Embodiments operate to provide allocation of time slot resources in TDMA based multi-hop wireless networks under the joint consideration of QoS and fairness. Embodiments operate with respect to information regarding maximal common slot set flow contention. An iterative process is applied with respect to the information regarding maximal common slot set flow contention to allocate communication resources providing a balance between meeting communication requirements and fairness. According to embodiments, an inter-graph process iteratively selects a maximal common slot set for which resource allocation with respect to various flows is to be performed and an intra-graph process assigns communication resources in the maximal common slot set providing a balancing between meeting communication requirements (e.g., QoS) and providing fairness. Other aspects, embodiments, and features are also claim and described.

18 Claims, 12 Drawing Sheets

(56) References Cited

U.S. PATENT DOCUMENTS

| | | | |
|---|---|---|---|
| 7,106,703 | B1 | 9/2006 | Belcea |
| 7,339,897 | B2 * | 3/2008 | Larsson et al. ............... 370/252 |
| 7,570,593 | B1 | 8/2009 | ElBatt et al. |
| 7,660,285 | B2 | 2/2010 | Xiong et al. |
| 7,773,569 | B2 | 8/2010 | Belcea |
| 7,813,373 | B2 | 10/2010 | Joshi et al. |
| 7,929,546 | B2 * | 4/2011 | Joshi et al. ............... 370/395.4 |
| 8,040,857 | B2 | 10/2011 | Wang et al. |
| 8,068,428 | B2 * | 11/2011 | Strutt et al. ............... 370/238 |
| 8,089,884 | B2 | 1/2012 | Liu |
| 8,170,567 | B2 | 5/2012 | Cai et al. |
| 8,320,244 | B2 | 11/2012 | Muqattash et al. |
| 8,451,862 | B2 * | 5/2013 | Huang et al. ............... 370/468 |
| 2003/0204587 | A1 | 10/2003 | Billhartz |
| 2005/0014510 | A1 | 1/2005 | Jeon |
| 2007/0058664 | A1 * | 3/2007 | Kim et al. ............... 370/447 |
| 2011/0013644 | A1 | 1/2011 | Das et al. |

FOREIGN PATENT DOCUMENTS

| | | | |
|---|---|---|---|
| CN | 101175041 | A | 5/2008 |
| CN | 101283523 | A | 10/2008 |
| DE | 102007022704 | A1 | 11/2008 |
| GB | 2409600 | | 6/2005 |
| JP | 2005531173 | T | 10/2005 |
| WO | 0039967 | | 7/2000 |
| WO | 03098816 | A2 | 11/2003 |
| WO | 2007149659 | A1 | 12/2007 |
| WO | 2008070871 | | 6/2008 |
| WO | 2009065958 | | 5/2009 |

OTHER PUBLICATIONS

Saito K., et al., "The time slot assignment method considering the interference among the communication flows for TDMA-based bandwidth reservation in wireless mesh networks," Technical Report of the Institute of Electronics, Information and Communication Engineers, vol. 106, No. 358 (IN2006-89 to 113), The Institute of Electronics, Information and Communication Engineers, Nov. 9, 2006: 91-96, ISSN: 0913-5685.

Crawley E, et al., "RFC 2386: A Framework for QoS-based Routing in the Internet", Aug. 1998, XP002219363, Retrieved from the Internet: URL:<ftp://ftp.isi.edu/in-notes/rfc2386.txt > the whole document.

Tajima S., et al., "Link Operation Scheduling Algorithm for Avoiding Interference in Ad-hoc Network," Proceedings of 2004 DICOMO Symposium (IPSJ Symposium Series, vol. 2004, No. 7), The Information Processing Society of Japan, Jul. 7, 2004, pp. 309-312, ISSN: 1344-0640.

Taki H., et al., "Ubiquitous Computing and its Application—Information Technology Popularized in Society and Home-," 1st ed., The Institute of Electrical Engineers of Japan, Sep. 30, 2008, pp. 31-34, ISBN: 978-4-88686-268-6.

* cited by examiner

MCSS-FCG1 (MAP COMMON SLOT SET 1: 36 SLOTS)

MCSS-FCG2 (MAX COMMON SLOT SET 2: 100 SLOTS)

MCSS-FCG3 (MAP COMMON SLOT SET 3: 120 SLOTS)

MCSS-FCG1 (MAP COMMON SLOT SET 1: 36 SLOTS)

MCSS-FCG2 (MAP COMMON SLOT SET 2: 100 SLOTS)

MCSS-FCG3 (MAP COMMON SLOT SET 3: 120 SLOTS)

SYSTEMS AND METHODS FOR RESOURCE ALLOCATION SERVING COMMUNICATION REQUIREMENTS AND FAIRNESS

PRIORITY CLAIM

The present Application for Patent is a divisional of patent application Ser. No. 12/684,577, entitled "SYSTEMS AND METHODS FOR RESOURCE ALLOCATION SERVING COMMUNICATION REQUIREMENTS AND FAIRNESS" filed Jan. 8, 2010, which claims priority to and the benefit of U.S. provisional patent application No. 61/225,599 entitled "Slot Allocation at Nodes for Meeting Quality of Service Constraints in Multihop Ultra Wideband Networks and Resource Allocation and Scheduling with Quality of Service and Fairness Requirements in TDMA Based Multihop Wireless Networks," filed Jul. 15, 2009. All of said applications are hereby expressly incorporated herein by reference as if fully set forth below and for all applicable purposes.

BACKGROUND

1. Field

The disclosure relates generally to network communication and, more particularly, to resource allocation for network communication.

2. Background

Information communication provided by various forms of networks has nearly become ubiquitous in the world today. Networks comprised of multiple nodes in communication using wireless and wireline links are used, for example, to carry data packets which may convey many types of data payload, such as voice data, multimedia data, alphanumeric data, graphics data, etc. Accordingly, the nodes of such networks may be computers, personal digital assistants (PDAs), phones, servers, routers, switches, multiplexers, modems, radios, access points, base stations, etc. Data packet flows are established between the network nodes to provide desired network communication, wherein the end-to-end data communication for any particular communication session may utilize multiple hops (i.e., be routed through one or more intermediate network node). Any number of the network nodes may be contending for network communication resources for providing such flows at any particular point in time.

A transmission between a pair of network nodes (e.g., wireless network nodes) may cause interference with respect to communications of one or more other network node (e.g., interfere with another transmission between a different pair of network nodes), if these transmissions overlap in time, frequency, and space domains. Hence, the success of such transmissions might only be ensured if they are separated in at least one of the aforementioned domains. A number of techniques for providing resource allocation for shared access to the network communication links may be implemented to facilitate network communications, such as frequency division multiple access (FDMA), time division multiple access (TDMA), spatial separation/isolation, etc. In a TDMA system the frequency domain is not utilized for providing communication orthogonality. For example, in a TDMA system time and space domains may be explored with respect to different transmissions in providing resource allocation for avoiding communication contention (e.g., TDMA operations and spatial reuse options explored for interference avoidance).

It is typically desirable to both meet traffic demand and provide fairness with respect to resource allocation techniques. However, conflicting objectives are present with respect to resource allocation and scheduling in wireless networks. Quality of service (QoS) and fairness are often both important in providing communications yet often times conflict for resource allocation and scheduling in wireless networks. For example, due to the resource sharing nature of various networks, without enforcing fairness, meeting traffic demand or a level of QoS for a subset of network flows may lead to resource starvation of another subset of network flows.

The problem of balancing QoS and fairness becomes more complex when a wireless network spans more than a single hop. This is due to the fact that different resource allocation patterns of two flows that do not contend for resources directly may result in different resource availability situations of a flow that directly contends for resources with the two aforementioned flows. As mentioned above, in TDMA systems time and space domains, for example, may be explored to provide resource allocation which avoids such communication contention. The computational complexity of maximizing the time slot allocation efficiency in TDMA wireless networks by exploiting the spatial reuse is, however, nondeterministic polynomial time (NP-complete), and thus can be quite complex (see A. M. Chou and V. O. K. Li, "Slot Allocation Strategies for TDMA Protocols in Multihop Packet Radio Networks," Proceedings of IEEE INFOCOM, vol. 2, pp. 710-716, May 1992, the disclosure of which is expressly incorporated herein by reference in its entirety). Several algorithms have been introduced to probabilistically achieve the maximum resource allocation efficiency without any consideration of QoS and fairness (see A. M. Chou and V. O. K. Li, "Slot Allocation Strategies for TDMA Protocols in Multihop Packet Radio Networks," Proceedings of IEEE INFOCOM, vol. 2, pp. 710-716, May 1992 and P. Bjrklund, P. Vrbrand, and D. Yuan, "Resource Optimization of Spatial TDMA in Ad Hoc Radio Networks: A Column Generation Approach," Proceedings of IEEE INFOCOM, vol. 2, pp. 818-824, April 2003, the disclosures of which are expressly incorporated herein by reference in their entireties).

QoS and fairness of resource allocation and scheduling in wireless networks have been studied in separate contexts extensively. Accordingly, various fairness measures have been introduced to address the fairness of resource allocation in multi-hop wireless networks. Some such solutions are designed to achieve specific objectives, such as proportional fairness (see e.g., L. B. Jiang and S. C. Liew, "Proportional Fairness in Wireless LANs and Ad Hoc Networks," Proceedings of IEEE Wireless Communications and Networking Conference (WCNC), vol. 3, pp. 1551-1556, March 2005, the disclosure of which is expressly incorporated herein by reference in its entirety) and max-min fairness (see e.g., X. Huang and B. Bensaou, "On Max-Min Fairness Bandwidth Allocation and Scheduling in Wireless Ad Hoc Networks: Analytical Framework and Implementation," Proceedings of ACM International Symposium on Mobile Ad Hoc Networking and Computing (MobiHoc), pp. 221-231, 2001, the disclosure of which is expressly incorporated herein by reference in its entirety). However, algorithms to achieve these objectives are usually complex and involve an appreciable amount of message exchanges (up to 5 hops away). Other resource allocation algorithms, such as a distributed implementation of a randomized time slot scheduling algorithm (DRAND), provide a level of fairness and spatial reuse in multi-hop ad hoc networks in the absence of specific objective functions (see e.g., I. Rhee, A. Warrier, and J. Min, "DRAND: Distributed Randomized TDMA Scheduling for Wireless Ad Hoc Networks," Proceedings of ACM MobiHoc, pp. 190-201, 2006, the disclosure of which is expressly incorporated herein by reference in its entirety. Although provided in the absence of specific objective functions, such fairness algorithms involve much less computational complexity and control message exchanges (up to 2 hop away). Nevertheless, all the foregoing fairness based resource allocation algorithms enforce fairness in the absence of QoS requirements.

In contrast to the aforementioned fairness based resource allocation algorithms, various resource allocation and scheduling algorithms have been introduced to solely meet QoS requirements. Some such QoS based resource allocation schemes (see e.g., H. Zhai, "QoS Support Over UWB Mesh Networks," Proceedings of IEEE Wireless Communications and Networking Conference (WCNC), pp. 2283-2288, March 2008, the disclosure of which is expressly incorporated herein by reference in its entirety) allocate time slot resources on a flow-by-flow basis to meet their traffic demand and can easily lead to unfair data flow congestion situations.

Some resource allocation algorithms have been introduced to address the tradeoff between QoS and fairness by dynamically scheduling time slots based on outstanding traffic loading and data flow contention (see e.g., J. Grnkvist, "Traffic Controlled Spatial Reuse TDMA in Multi-Hop Radio Networks," Proceedings of IEEE PIMRC, vol. 3, pp. 1203-1207, September 1998 and H. L. Chao and W. Liao, "Credit-Based Slot Allocation for Multimedia Mobile Ad Hoc Networks," IEEE Journal on Selected Areas in Communications, vol. 21, no. 10, pp. 1642-1651, 2003, the disclosures of which are expressly incorporated herein by reference in their entireties). A gradient method based resource allocation scheme (see e.g., L. Chen, S. H. Low, and J. C. Doyle, "Joint Congestion Control and Media Access Control Design for Ad Hoc Wireless Networks," Proceedings of IEEE INFOCOM, vol. 3, pp. 2212-2222, March 2005, the disclosure of which is expressly incorporated herein by reference in its entirety) may be utilized to gradually regulate the data rate of each end-to-end data flow so that a utility function can be maximized across the network under the underlying data flow contention constraint. The foregoing schemes, however, require adjusting allocated resources in a highly dynamic manner. Demand assigned TDMA-based wireless networks, such as WiMedia networks (see e.g., "Standard ECMA-368 High Rate Ultra Wideband PHY and MAC Standard," Url: http://www.ecma-international.org/publications/standards/Ecma-368.htm, December 2008 and "Standard ECMA-387 High Rate 60 gHz PHY, MAC and HDMI PAL," Url: http://www.ecma-international.org/publications/standards/Ecma-387.htm, December 2008, the disclosures of which are expressly incorporated herein by reference in their entireties), depend on explicit message transactions among wireless devices for resource assignment and expect such resource assignment to be static over a period of time. Accordingly, the aforementioned resource allocation schemes are not suitable to be deployed in demand assigned TDMA wireless networks.

BRIEF SUMMARY OF SOME SAMPLE EMBODIMENTS

The present disclosure is directed to systems and methods which provide a demand aware fair resource allocation technique operable to allocate communication resources in multi-hop networks under the joint consideration of communication requirements and fairness. For example, embodiments operate to provide allocation of time slot resources in TDMA based multi-hop wireless networks under the joint consideration of QoS and fairness requirements. The demand assigned time slots can be static during data flow holding times, thus embodiments of the present disclosure are well suited for use with respect to demand assigned TDMA based networks, such as WiMedia networks.

In meeting the traffic demand of individual data flows while preserving fairness among multiple flows, embodiments herein operate in accordance with multiple objectives derived from consideration of communication requirements and fairness. The operational objectives of embodiments include that each data flow should be guaranteed a certain amount of resources (e.g., time slots in a TDMA system), when every data flow has saturated traffic demand. This objective imposes a standard of fairness upon the operation of the resource allocation technique. The operational objectives of embodiments additionally or alternatively include the traffic demand of a data flow should be fully met if it is lower than the fair share of that flow. This objective also provides a standard of fairness upon the operation of the resource allocation technique, particularly where the fair share resource threshold is established to provide an appropriate minimum level of resource allocation to the data flows. The operational objectives of embodiments further additionally or alternatively include providing a balance between the benefit of serving traffic demand as much as possible and the risk of congestion induced by allocating resources above fair shares. This objective imposes communication requirements (e.g., QoS) considerations upon the operation of the resource allocation technique.

Embodiments of the present disclosure operate with respect to information regarding maximal common slot set flow contention (e.g., using sets of maximal common slot set based flow contention graphs). An iterative process is applied with respect to the information regarding maximal common slot set flow contention to allocate communication resources providing a balance between meeting communication requirements, such as QoS, and fairness. For example, an outer loop (e.g., an "inter-graph" process) of a technique of an embodiment herein may iteratively select a maximal common slot set for which resource allocation with respect to various flows is to be performed. An inner loop (e.g., an "intra-graph" process) of the technique of such an embodiment may thereafter assign communication resources in the maximal common slot set providing a balancing between meeting communication requirements (e.g., QoS) and providing fairness.

Embodiments of resource allocation techniques disclosed herein are well suited to be deployed in any distributed TDMA-based multi-hop wireless network, such as a WiMedia network. In operation according to embodiments in such distributed multi-hop networks, network nodes advertise their available communication resources (e.g., time slots) among their neighbors (e.g., 2-hop neighbors). Network nodes of embodiments also exchange messages among each other to request and grant communication resources (e.g., time slots) for new arrival data flows whose routes may be established across themselves.

The foregoing has outlined rather broadly the features and technical advantages of embodiments of the present disclosure in order that the detailed description that follows may be better understood. Additional features and advantages will be described hereinafter which form the subject of the claims. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope as set forth in the appended claims. The novel features which are believed to be characteristic of embodiments of the disclosure, both as to their organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which.

DETAILED DESCRIPTION

Meeting traffic demand and enforcing fairness are often times necessary but conflicting objectives for resource allocation and scheduling in providing network communications. Due to the resource sharing nature of networks, particularly wireless networks, meeting traffic demand of a subset of network data flows without enforcing fairness may lead to resource starvation of another subset of network data flows. Balancing these two objectives is more complex in TDMA-based multi-hop wireless networks, as the contention of time slots could be indirect. For example, different resource allocation patterns of two data flows that do not contend for resources directly may result in different resource availability situations of a data flow that directly contends for resources with the two aforementioned flows.

Figure 1A:
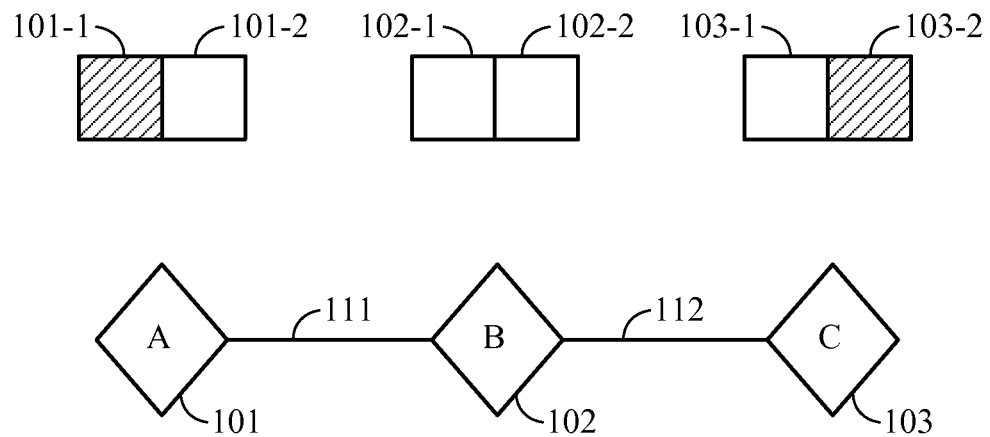
FIG. 1A illustrates resource assignment with respect to data flows in contention resulting in demand remaining unserved.

An example of the foregoing resource contention is illustrated in FIG. 1A, wherein two time slots (illustrated as time slots 101-1 and 101-2 for data flow 101, time slots 102-1 and 102-2 for data flow 102, and time slots 103-1 and 103-2 for data flow 103) are available for three one hop data flows (data flows 101-103). In this example it is assumed that each data flow requires one time slot to serve its traffic demand. Contention for the time slots between the various data flows is represented by contention lines 111 and 112. As shown in FIG. 1A, data flows 101 and 102 are in contention for the two available time slots and data flows 102 and 103 are in contention for the two available time slots, although there is no contention for the two available time slots between data flows 101 and 103. The resource allocation strategy illustrated in FIG. 1A, wherein the first time slot is allocated to flow 101 and the second time slot is allocated to flow 103, leaves flow 102 with no time slot allocation. That is, because data flow 102 contends with both data flows 101 and 103, there is no contention free time slot available for use by data flow 102 in the resource allocation strategy shown in FIG. 1A.

Figure 1B:
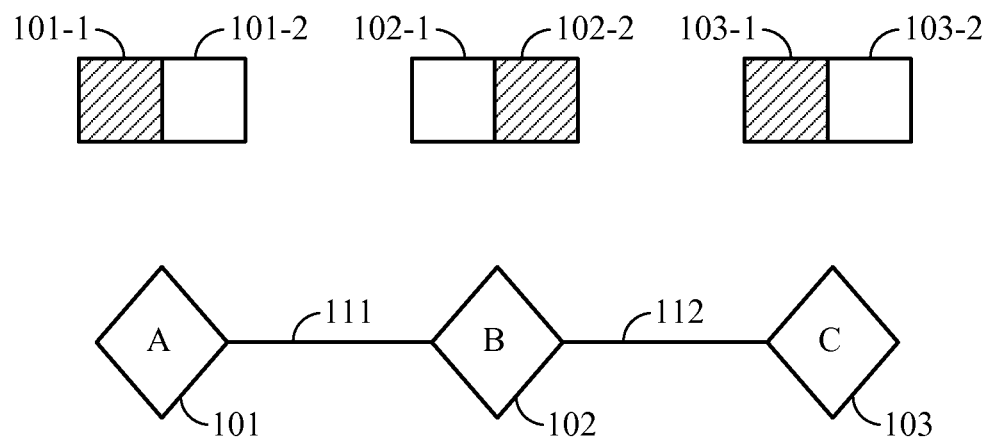
FIG. 1B illustrates resource assignment with respect to data flows in contention resulting in demand being served.

The resource allocation strategy illustrated in FIG. 1B, however, accommodates each of the data flow's traffic demand. Specifically, time slots are allocated such that data flows in contention utilize a different one of the two available time slots, here time slots 101-1 and 102-2 as between data flows 101 and 102 and time slots 102-2 and 103-1 as between data flows 102 and 103. Accordingly, the resource allocation shown in FIG. 1B serves the traffic demand of all three flows.

Techniques of the present disclosure operate to allocate communication resources, such as time slots in TDMA-based multi-hop wireless networks, with considerations of both traffic demand and fairness. Accordingly, embodiments allocate communication resources in a particular manner to reduce resource contention and its subsequent fairness issue while striking a balance between meeting traffic demand and enforcing fairness when resource contention becomes inevitable. In meeting the traffic demand of individual data flows while preserving fairness among multiple data flows, embodiments herein operate to guarantee a certain amount of network resources (referred to herein as a "fair share") for each data flow when the data flows have saturated traffic demand, fully meet the traffic demand of a data flow if the data flow's traffic demand is lower than the fair share of that flow, and/or provide a balance between the benefit of serving traffic demand as much as possible and the risk of congestion induced by allocating resources above fair shares.

Resource allocation techniques implemented in accordance with embodiments of the present disclosure are well suited to be deployed in a distributed multi-hop network, such as a TDMA wireless WiMedia network. In such multi-hop networks, network nodes may operate to advertise their available time slots among their neighbors (e.g., their 2-hop neighbors). Such network nodes may additionally or alternatively exchange messages among each other to request and grant communication resources for new arrival data flows whose routes may be established across themselves.

In order to aid in understanding the concepts presented herein, the discussion immediately below provides an explanation of various terms used herein to describe embodiments. Details with respect to the features and functions of particular embodiments providing resource allocation techniques consistent with the concepts described herein follows the explanation of the various terms.

A data flow as used herein comprises a communication link between a sender (e.g., a transmitting network node) and a receiver (e.g., a receiving network node). The end-to-end data flow may comprise a single hop (a one-hop data flow)

between the sender and receiver, with no intermediate network nodes disposed therebetween. Alternatively, end-to-end data flows may comprise multiple hops (a multi-hop data flow) between the sender and receiver, and thus have intermediate network nodes disposed therebetween. Nevertheless, a multi-hop data flow may be decomposed into multiple one-hop data flows which combine to provide an end-to-end multi-hop data flow. One-hop data flows, whether providing an end-to-end one-hop link between a sender and receiver or a portion of an end-to-end multi-hop link between a sender and receiver, may be referred to as a one-hop data flow or simply a data flow. Such data flows are generally bidirectional (e.g., to and from a sender and receiver) so that both data and acknowledgement transmissions can be taken into account.

Resource allocation techniques of embodiments utilize the concept of maximal common slot sets to identify particular communication resources for allocation to particular data flows. In a TDMA-based wireless network, for example, a one hop data flow can only be assigned for transmissions in some specific time slots. This is due to the fact that its sender and receiver have already been participating in transmissions and/or receptions of different sets of existing data flows, which leads to the situation that some time slots may be available for its sender but unavailable for its receiver and vice versa. Therefore, only time slots that are available to both the sender and the receiver can be assigned for the underlying one hop data flow. It is possible that a set of time slots are commonly available to a group of one hop data flows.

A common slot set, as used herein, is a set of communication resources or slots (e.g., time slots) that are commonly available to a group of data flows. The group of data flows is said to be the flow occupant set of the common slot set. A maximal common slot set, as used herein, is a common slot set that is not a subset of any other common slot set.

In network communications, particularly wireless network communications, a transmission between a pair of network nodes may cause strong interference with another transmission between a different pair of network nodes, if these two transmissions overlap in time, frequency, and space domains. Accordingly, such transmissions might only be successful, if they are separated in at least one of the aforementioned domains. Two one-hop data flows may be said to be contending flows for each other if a data packet transmission of one data flow causes strong interference to a concurrent data packet transmission of another data flow and subsequently induces transmission failures. Under a protocol model, two data flows may be said to contend with each other if either the source or the destination of a data flow is within the nominal communication range of that of another data flow.

Figure 2A:
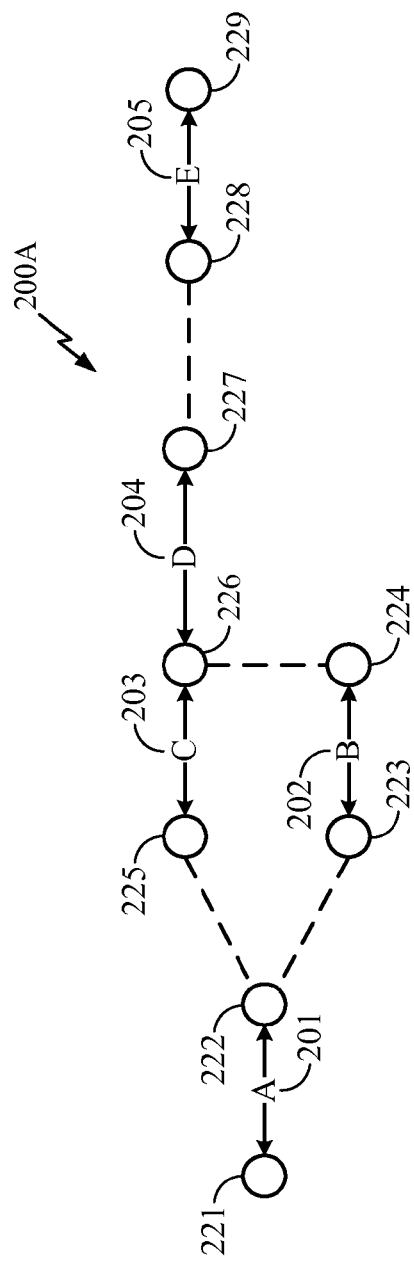
FIG. 2A shows a nodal graph including network nodes and associated data flows.
Figure 2B:
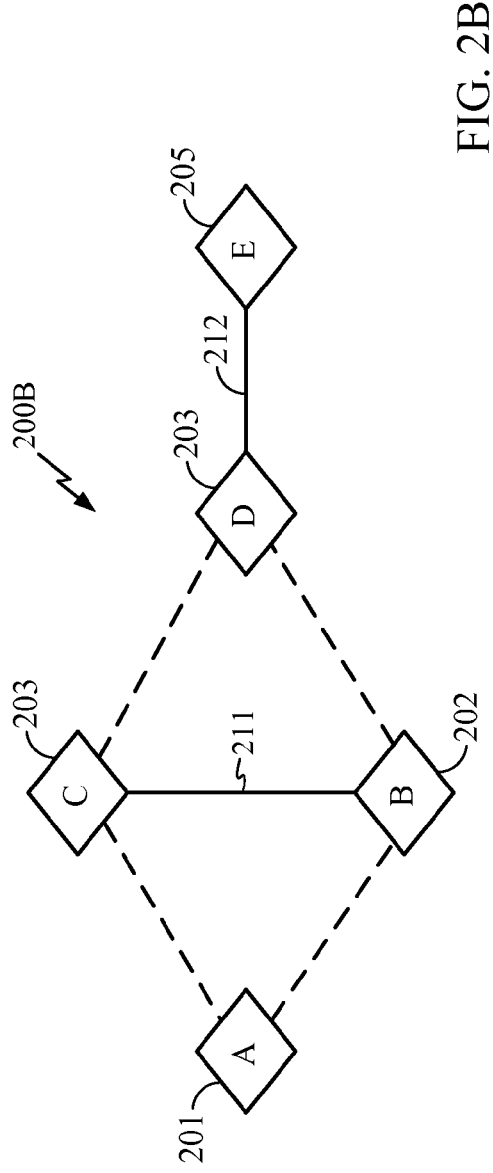
FIG. 2B shows a flow contention graph corresponding to the nodal graph of FIG. 2A.

An exemplary flow contention graph, showing multiple data flows and their associated contentions, is illustrated in FIG. 2B as including data flows 201-205 and contention indicators 211 and 212. FIG. 2A shows a nodal graph of network 200A, which includes network nodes 221-229 and data flows 201-205, corresponding to flow contention graph 200B of FIG. 2B. Network nodes 221-229 may have the same or different node configurations, such as may comprise various ones of computers, personal digital assistants (PDAs), phones, servers, routers, gateways, switches, multiplexers, modems, radios, access points, base stations, etc. The network links used in carrying data flows 201-205 may utilize various media, such as copper wire, fiber optic line, air interface (e.g., radio frequency, infra-red, etc.), and/or the like. Thus, the network links of such networks may comprise wireline links, wireless links, and combinations thereof. The mapping between the foregoing nodal graph with one-hop data flows and flow contention graph is well known. As can readily be seen from the flow contention graph of FIG. 2B, flow contention exists between data flows 202 and 203 (contention indicator 211) as well as between data flows 204 and 205 (contention indicator 212).

Figure 3C:
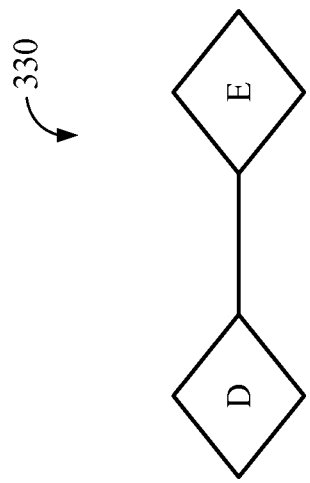
FIGS. 3A-3C show maximal cliques into which the flow contention graph of FIG. 2B may be decomposed into.
Figure 3B:
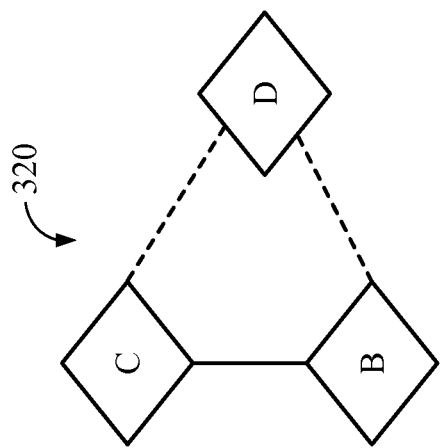
Figure 3A:
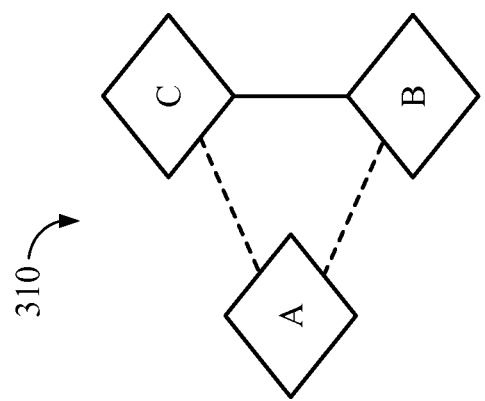

A maximal clique is a set of vertices in a flow contention graph that induces a complete sub-graph, and that is not a subset of the vertices of any larger complete sub-graph. A flow contention graph can therefore be decomposed into one or multiple maximal cliques of data flows. The flow contention graph of FIG. 2B may be decomposed into the maximal cliques 310-330 shown in FIGS. 3A-3C. The degree of a maximal clique is the number of vertices in that clique. For example, the degree of maximal cliques 310 and 320 is 3 and the degree of maximal clique 330 is 2.

In utilizing maximal common slot sets to identify particular communication resources for allocation to particular data flows, resource allocation techniques of embodiments utilize the concept of maximal common slot set based flow contention graphs (MCSS-FCGs) to identify slots and data flows for which separation in one of the foregoing domains may be provided. A MCSS-FCG is a flow contention graph with respect to a maximal common slot set, which is available to all data flows in the graph. A MCSS-FCG may be denoted by $G=(V,E)$, where V is the set of all one hop data flows in the network that share a maximal common slot set, and E is the set of edges in G. Two vertices share an edge if and only if the two data flows represented by the two vertices contend with each other during those slots.

A MCSS-FCG is meaningful with respect to its maximal common slot set and MCSS-FCGs associated with different maximal common slot sets are distinct. Data flows that are assigned slots in different maximal common slot sets do not contend with each other and thus do not appear in the same MCSS-FCG. A nodal graph with data flows in a TDMA-based multi-hop wireless network can be converted into multiple MCSS-FCGs. When all time slots are commonly available to all data flows in the TDMA network, there exists a unique MCSS-FCG in the network, which is a flow contention graph in a traditional sense.

Figure 4:
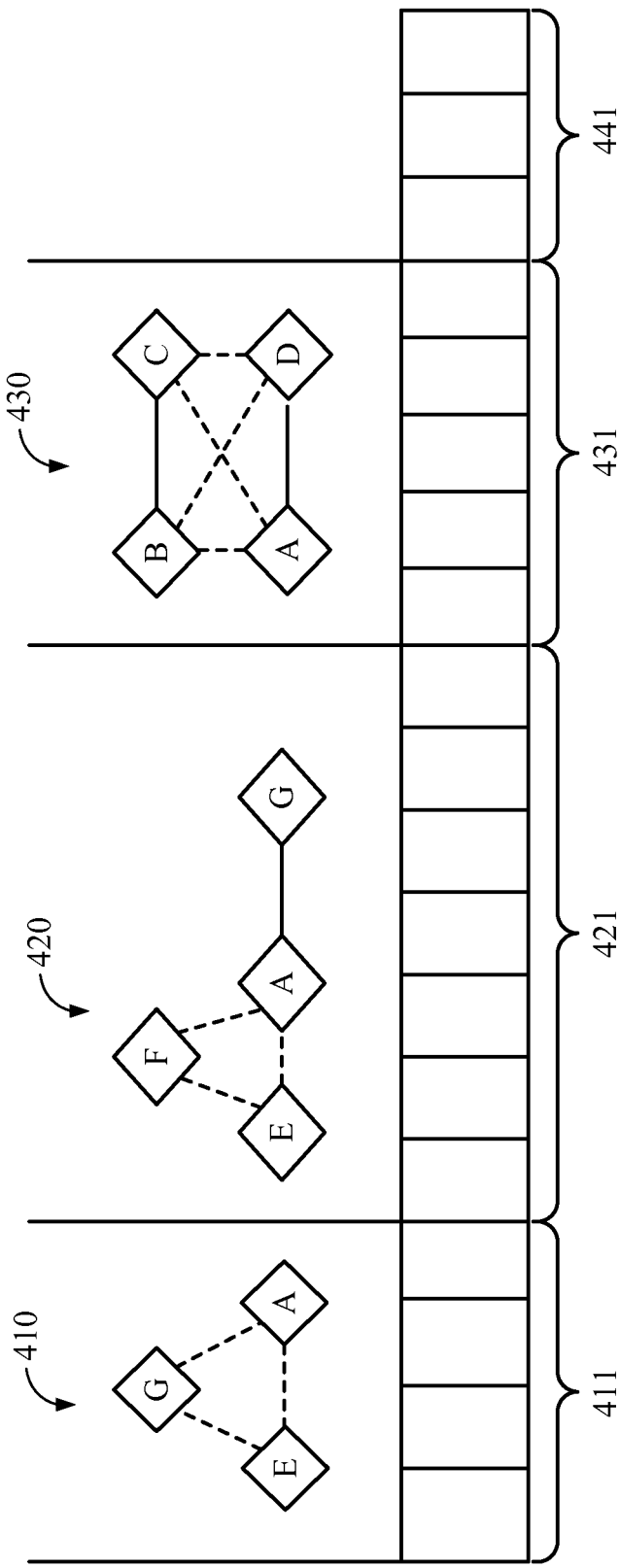
FIG. 4 shows maximal common slot sets of a maximal common slot set based flow contention graph (MCSS-FCG)

An example of the relation between the maximal common slot sets of a MCSS-FCG is illustrated in FIG. 4. Specifically, FIG. 4 shows MCSS-FCGs 410-430 having corresponding maximal common slot sets 411-431, respectively, associated therewith (slot set 441 being an unavailable slot set). As can be seen in the example of FIG. 4, a data flow may reside in multiple MCSS-FCGs. For example, each of slot sets 411-431 are available for data flow A, while slot sets 411 and 421, but not slot set 431, are available to data flows E and G.

In providing resource allocation with fairness, embodiments of the present disclosure utilize a concept of a fair share in a maximal common slot set flow contention. A fair share, as used herein, is a certain amount of slots (e.g., time slots) that are to be assigned to a data flow when data flows in the network have saturated traffic demand, wherein saturated traffic demand refers to traffic demand that cannot be served using all the available slots. Implementation of a fair share according to embodiments ensures a data flow will receive a fair amount of slots when the network capacity is overloaded.

Fair shares may be assigned based on different objectives, arbitrarily assigned based on the user service agreement, based upon the particular data flow, data flow type, etc. The fair shares assigned to data flows usually facilitate the purpose of maximizing spatial reuse while preventing the starvation of any data flows. For example, fair share assignment strategies of embodiments strive to prevent the starvation of flows that reside in a maximal clique with a large degree, as the level of resource contention in such maximal cliques is generally high.

In a TDMA-based multi-hop wireless network, the fair share of embodiments is meaningful with respect to a specific MCSS-FCG. When the sets of time slots associated with two MCSS-FCGs are both available to a one-hop data flow, the one-hop data flow resides in both MCSS-FCGs. Thus, there is a fair share value to be assigned to this flow in each MCSS-FCG according to embodiments herein.

Figure 5:
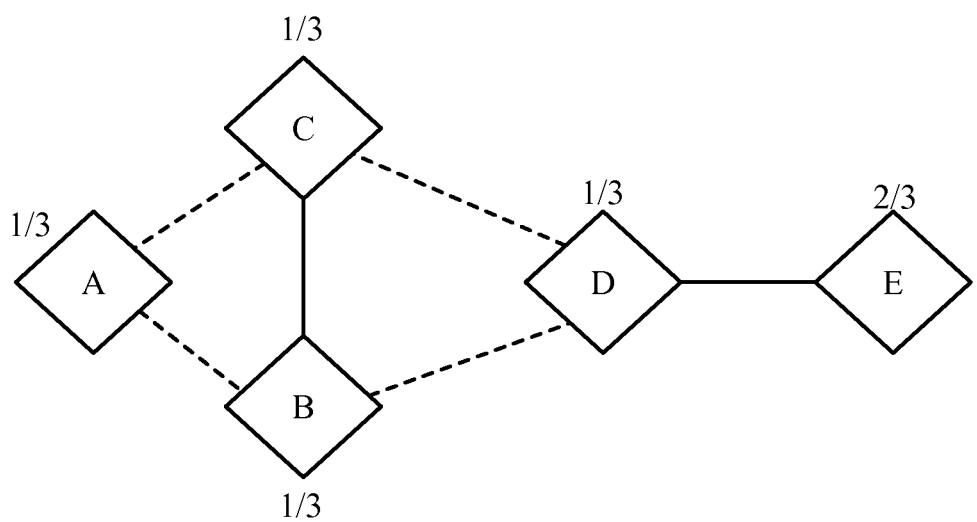
FIG. 5 illustrates normalized max-min fair share assignment in a perfect graph.

FIG. 5 illustrates normalized max-min fair share assignment in a perfect graph. Such max-min fair share assignment fully utilizes the spatial reuse and provides the max-min fairness so that the share of a data flow can only increase if its increment does not induce the decrement of the share of another data flow, whose share is less than or equal to the former data flow's share.

Obtaining max-min fair shares in multi-hop wireless networks generally requires a considerable amount of control message exchange overhead. Accordingly, resource allocation techniques implemented according to embodiments herein utilize pre-assigned fair share values to avoid or minimize such control message exchange overhead. For example, to reduce the computational complexity, the pre-assigned fair share (f) of a one-hop flow in a MCSS-FCG is set equal to the inverse of the degree (d) of the maximal clique the flow resides in (i.e., $$f = \frac{1}{d}$$

according to embodiments.

To aid in understanding the concepts of the present disclosure, embodiments are described below with reference to TDMA-based multi-hop wireless networks, such as WiMedia based UWB network configurations. It shall be appreciated, however, that the concepts herein are applicable to various network configurations, protocols, and resource allocation techniques. For example, embodiments of the present disclosure may be provided with respect to any distributed TDMA MAC.

At any point in time, a TDMA-based multi-hop wireless network may be serving existing data flows across its wireless devices. A set of new arrival data flows may be initiated in the network. To negotiate the amount of traffic demand to be served in the network, signaling mechanisms should be deployed to compute and then reserve time slots for the one-hop data flows along the selected routes. For example, to support obtaining maximal common slot sets, network nodes (e.g., network nodes 221-229 of FIG. 2) of embodiments advertise (e.g., transmitting or otherwise making available) their new arrived data flows and the available time slots for these new arrived data flows to neighboring network nodes (e.g., their neighbors within 2 successive hops of the node, such as by network node 225 advertising the information to network nodes 226 and 227). The set of network nodes from which such information may be advertised includes maximally all network nodes that are sources and/or destinations of new arrived data flows in the network.

To exchange the optimality of the resource allocation solution with the control overhead utilized, the set of data flows that are involved in resource allocation computation is provided according to embodiments by a distributed execution of the resource allocation algorithm. Embodiments herein operate to compute all maximal common slot sets by grouping time slots that have identical flow occupant sets. The maximum computational complexity of the foregoing is of $O(n^2)$, where n is the number of time slots.

Resource allocation algorithms implemented according to embodiments of the present disclosure operate to serve as much traffic demand as possible, as well as reduce the risk of starving new arrival data flows. Accordingly, resource allocation algorithms of embodiments operate to fully meet the portion of traffic demand within the fair share of a data flow and jointly minimize the cost associated with inadequate serving of traffic demand and the cost associated with allocating excessive amount of time slots above fair shares.

Figure 6:
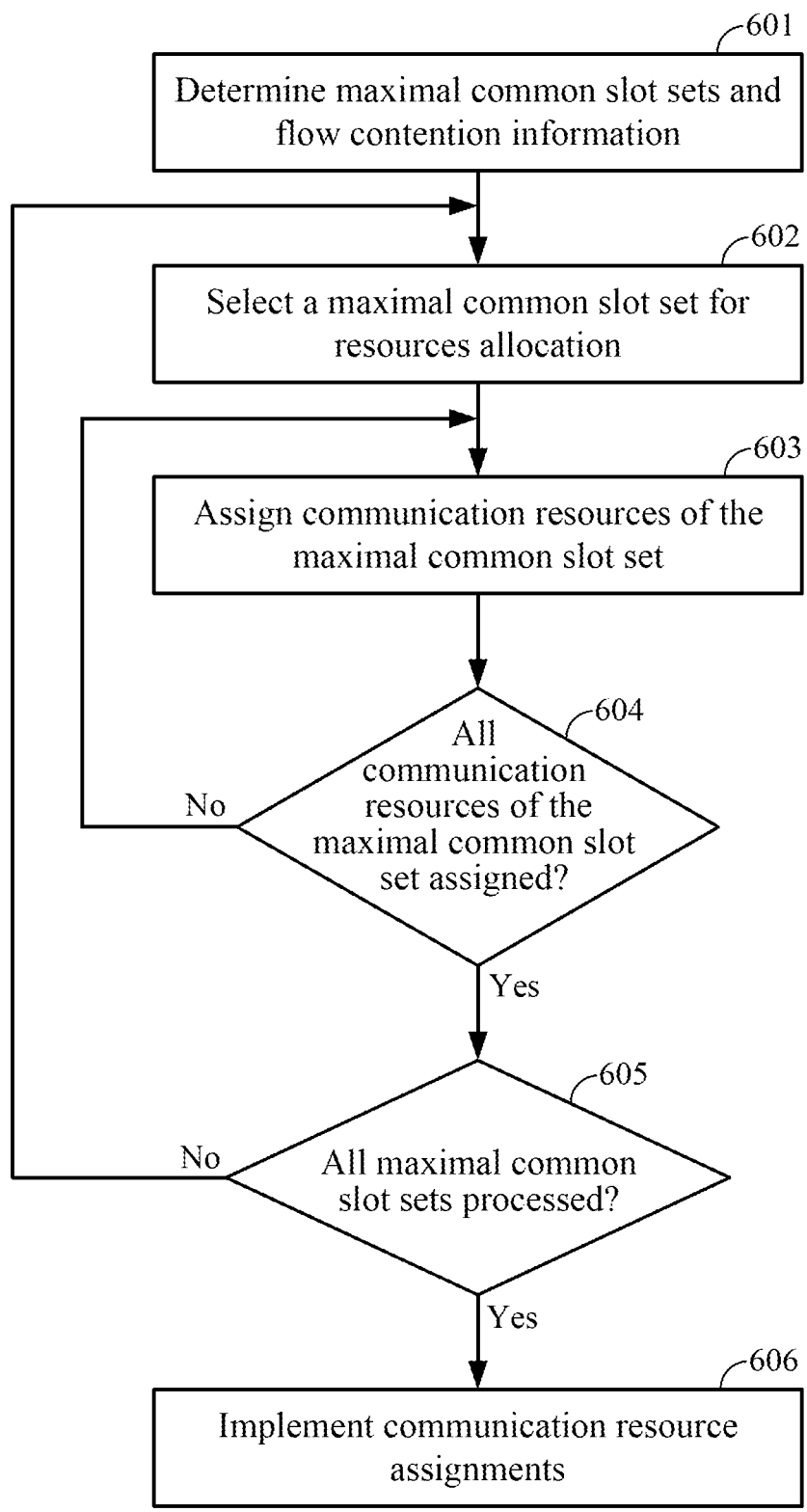
FIG. 6 shows a high level flow diagram of a resource allocation technique of embodiments herein.

Directing attention to FIG. 6, a high level flow diagram of a resource allocation technique of embodiments herein is shown. The resource allocation technique of the illustrated embodiment is executed with respect to maximal common slot set flow contention information, such as may be provided by the aforementioned MCSS-FCGs. Accordingly, at block 601 of the illustrated embodiment maximal common slot set information and maximal common slot set flow contention information is determined For example, MCSS-FCGs with respect to multiple data flows may be generated in block 601. A complete MCSS-FCG may span multiple maximal cliques. Hence, the effort of obtaining a complete MCSS-FCG can be prohibitive in some implementations. Accordingly, the set of MCSS-FCGs used for resource allocation computation according to embodiments may only cover maximal cliques that the underlying data flow resides in so as to reduce the control message exchange overhead.

Blocks 602-605 of the illustrated embodiment provide operation to determine resource allocation which provides a balance between meeting communication requirements (e.g., QoS) and fairness. The illustrated resource allocation technique includes two processes, referred to herein as an inter-graph process and an intra-graph process. The inter-graph process of the illustrated embodiment, demarcated by boxes 602 and 605, operates to iteratively select maximal common slot sets and their associated MCSS-FCGs. The intra-graph process of the illustrated embodiment, demarcated by boxes 603 and 604, operates to assign communication resources in accordance with the concepts herein.

In operation according to the illustrated embodiment, at block 602, the inter-graph process operates to select a maximal common slot set for resource allocation. Although the inter-graph process of embodiments itself does not allocate any time slots, its selection of the maximal common slot set is adapted to provide resource allocation meeting the traffic demand At block 603, the intra-graph process operates to assign communication resources of the maximal common slot set selected by the current iteration of the inter-graph process. The intra-graph process of embodiments assigns slots in the underlying MCSS-FCG under an objective of balancing between QoS and fairness. At block 604 a determination is made as to whether all communication resources of the selected maximal common slot set have been assigned. If not, processing of the intra-graph process continues at block 603. If so, processing proceeds to block 605 wherein a determination is made as to whether all the maximal common slot sets have been processed. If not, processing of the inter-graph process continues at block 602. If so, processing proceeds to block 606. Additional detail with respect to operation of embodiments of inter-graph and intra-graph processes is provided below.

At block 606 of the illustrated embodiment, the computed resource allocations are implemented to provide desired data flows. For example, once the computations regarding resource assignments are finished, the source and the destination of the underlying flow of embodiments advertise to the source and/or the destination of a contending flow the slot assignment of that contending flow in its own computation for contention free resource allocation implementation. To ensure a feasible final slot assignment according to embodiments, the final slot assignment of a data flow is set to the minimum among all assignment results of this data flow calculated by the source or the destination of the data flow itself and its contending data flows.

Having described operation of a resource allocation technique implementing an inter-graph process and an intra-graph process at a high level, detail with respect to particular embodiments of such inter-graph and intra-graph processes are provided below. It should be appreciated that the particular embodiments of such inter-graph and intra-graph processes may be utilized in the resource allocation technique of FIG. 6 above.

Figure 7:
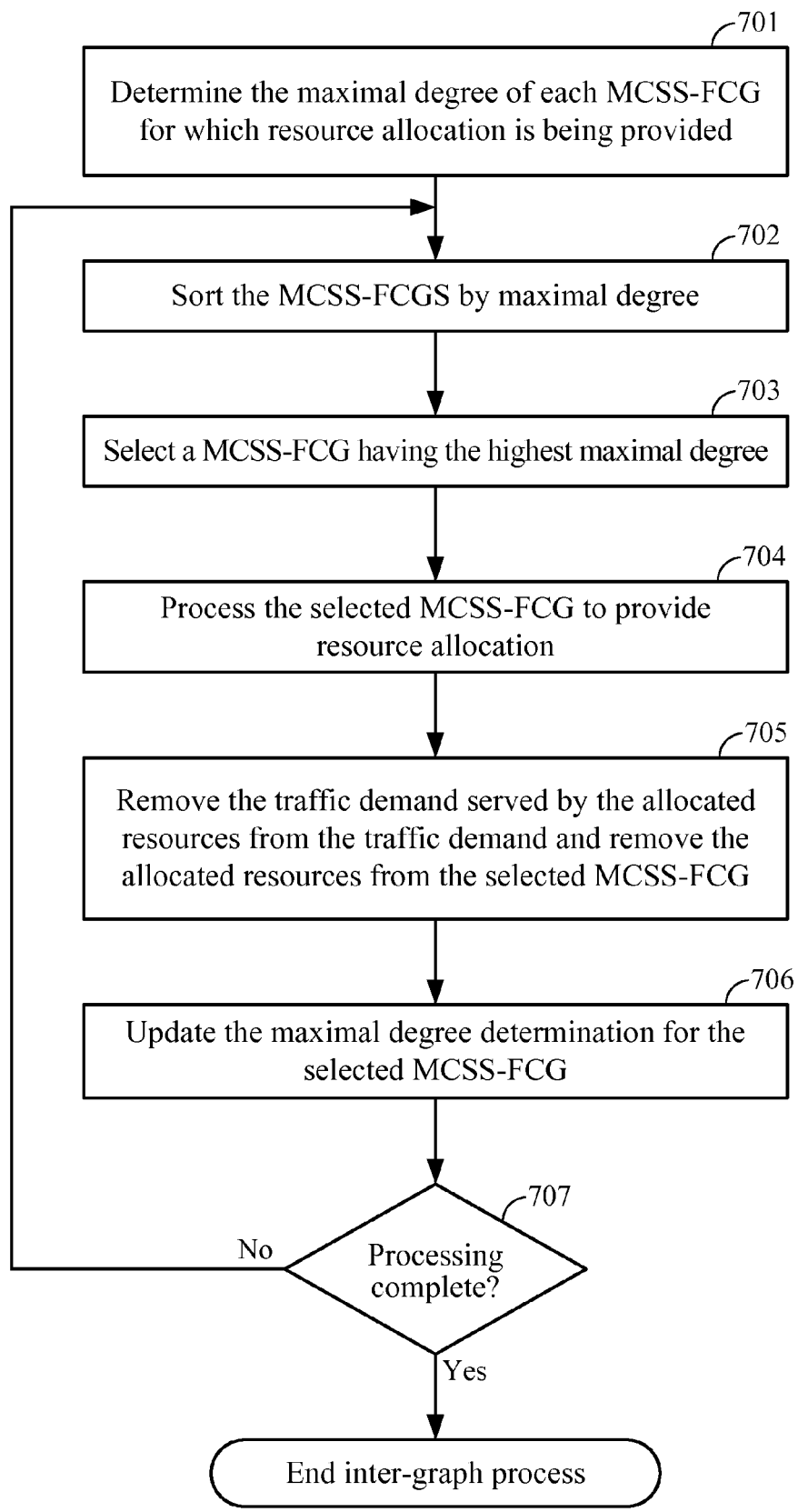
FIG. 7 shows a flow diagram of operation of an inter-graph process according to embodiments.

FIG. 7 shows a flow diagram of operation of an inter-graph process according to embodiments of the disclosure. The following notations are useful in understanding details of an embodiment of the inter-graph process of FIG. 7. The set of MCSS-FCGs based on which the resource allocation algorithm executes may be denoted by $\{G_n\}$, where $n=1, 2, \ldots, N$. The set of maximal cliques in $G_n$ may be denoted by $\{cl_n^k\}$, $k=1, 2, \ldots, K$ and the degree of $cl_n^k$ may be denote by $d_n^k$. The set of one hop flows in $\{G_n\}$ may be denoted by $\{s_l\}$, $l=1, 2, \ldots, L$, and the outstanding traffic demand of $s_l$ may be denoted by $q_l$.

At block 701 of the illustrated embodiment the maximal degree, $\hat{d}_n$, for each MCSS-FCG of the set of MCSS-FCGs for which resource allocation is to be provided, $G_n$, is determined. For example, the maximal degree may be determined by $\hat{d}_n = \max_{k=1}^{K} d_n^k$. At block 702 the set of MCSS-FCGs, $G_n$, is sorted by maximal degree, $\hat{d}_n$, wherein the original index of the $i^{th}$ MCSS-FCG in the sorted set may be denoted by $n_i$. Embodiments sort the MCSS-FCGs in ascending order of maximal degree.

At block 703 a MCSS-FCG having the highest maximal degree, $G_{ni}$, is selected for resource allocation processing and at block 704 the selected MCSS-FCG is processed to provide resource allocation in accordance with the concepts herein. For example, processing in accordance with block 704 may apply an intra-graph process disclosed herein.

At block 705, the traffic demand served by the allocated resources is removed from the traffic demand and the resources that have been allocated are removed from the available resources in the selected MCSS-FCG. The traffic demand that can be served in the selected MCSS-FCG, $G_{ni}$, for the set of one hop data flows therein, $s_l$, can be denoted as $q_l^{ni}$, the remaining outstanding traffic demand, $q_l$, may be determined by, for $l=1, 2, \ldots, L$, $q_l = q_l - q_l^{ni}$. The intra-graph process utilized according to embodiments herein ensures that $q_l \geq 0$. A set of one hop flows, $s_l$, may be removed from the MCSS-FCGs, $G_n$, when the outstanding traffic demand for that set of one hop flows is exhausted (i.e., $q_l = 0$).

At block 706, the maximal degree, $\hat{d}_n$, determination for the selected MCSS-FCG, $G_{ni}$, is updated to reflect the resource assignments made. Thereafter, at block 707 of the illustrated embodiment, a determination is made as to whether processing with respect to the inter-graph process is complete. For example, a determination may be made as to whether any unserved traffic demand remains and any MCSS-FCGs have unassigned resources associated therewith. If processing is not complete, operation according to the illustrated embodiment returns to block 702 for resorting of the MCSS-FCGs. However, if processing is complete, the inter-graph process of the illustrated embodiment ends.

From the foregoing it can be appreciated that the inter-graph process of embodiments utilizes the slots of a MCSS-FCG ahead of all the rest MCSS-FCGs, if the flow contention level of the aforementioned MCSS-FCG is the lowest among all the rest MCSS-FCGs. Once a set of slots is assigned to a data flow in an intra-graph process, the traffic demand of this data flow is reduced accordingly in the foregoing inter-graph process. By utilizing the slots in a MCSS-FCG that has a lower contention level, the traffic demand of a data flow can be served as much as possible before the number of precious common slots that other contending data flows share with this data flow in a highly dense MCSS-FCG is depleted. Once the demand of a data flow is fully met, the data flow is removed from the set of MCSS-FCGs in the above inter-graph process. Hence, the inter-graph process aggressively reduces the degree of MCSS-FCGs along the process.

Figure 8:
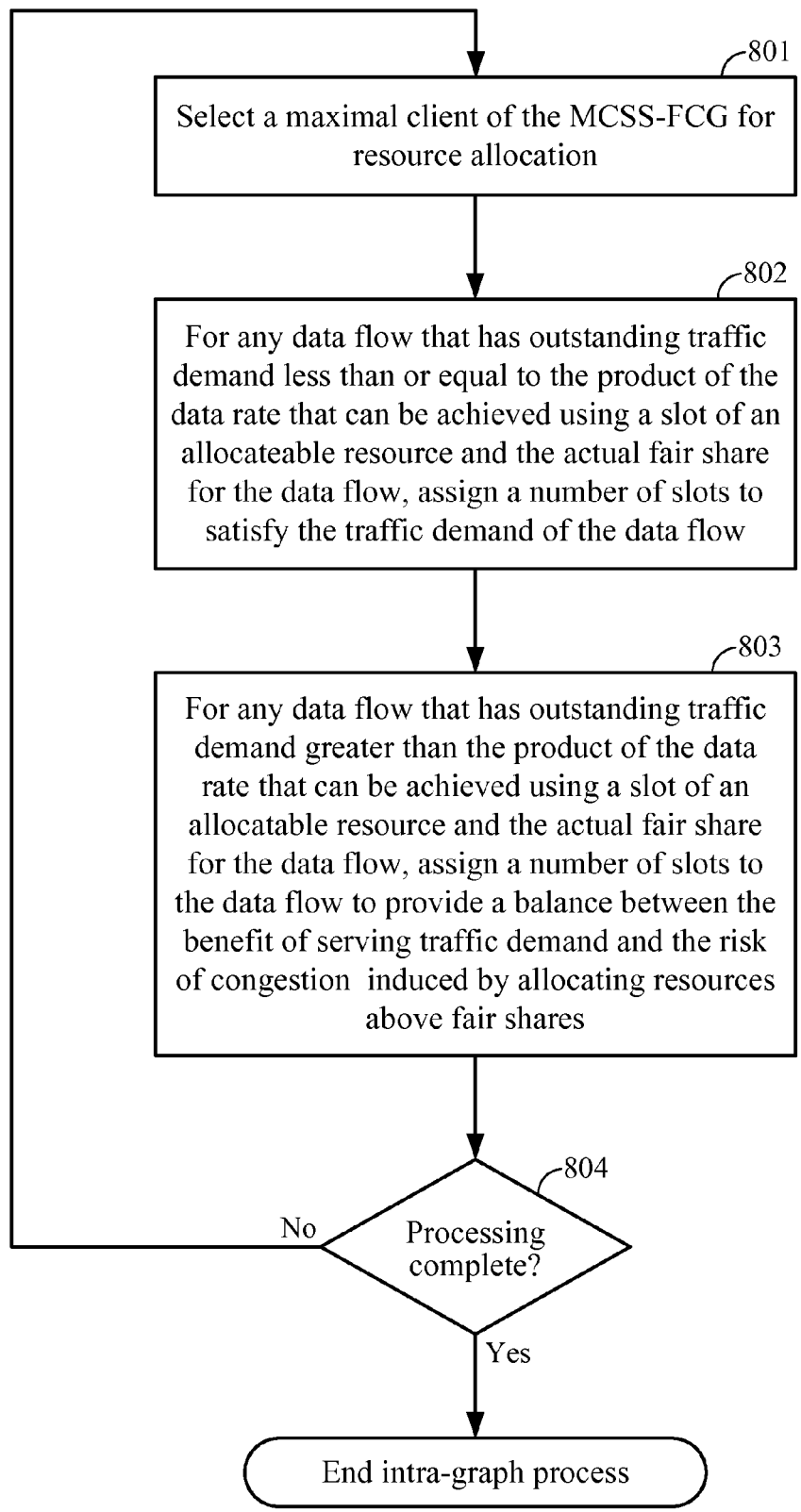
FIG. 8 shows a flow diagram of operation of an intra-graph process according to embodiments.

FIG. 8 shows a flow diagram of operation of an intra-graph process according to embodiments of the disclosure. The following notations are useful in understanding details of an embodiment of the intra-graph process of FIG. 8. With respect to a maximal clique, the actual number of slots allocated for flow i is denoted as $x_i$ and the actual fair share for flow i is denoted as $f_i$. The data rate (e.g., in bits per slot) that can be achieved by using one time slot in a TDMA frame to flow i is denoted as $R_i$. The cost function induced by allocating z time slots above the fair share of a flow may be denoted by $u(z)$ and the cost function induced by inadequate serving of traffic demand of a flow may be denoted by $v(z)$, where z denotes the traffic demand that is not served after the allocation. The acceleration of the cost induced by allocating time slots beyond fair share for flow i is denoted by $U_i(x)$ and the deceleration of the cost induced by inadequately serving traffic demand for flow i is denoted by $V_i(x)$.

The intra-graph process of embodiments iterates over all maximal cliques in the underlying MCSS-FCG. Accordingly, at block 801 of the illustrated embodiment a maximal clique of the MCSS-FCG is selected for resource allocation. Thus, for each maximal clique, an intra-graph resource allocation algorithm as set forth in blocks 802 and 803 is executed to calculate the number of slots to be assigned to each data flow that resides in the maximal clique. If a data flow resides in multiple maximal cliques, the number of slots to be assigned to the data flow in the underlying MCSS-FCG according to embodiments is set to the minimum of all values assigned to the data flow.

A data flow may contend with multiple data flows in a MCSS-FCG. Accordingly, resource assignment in accordance with the illustrated embodiment of the intra-graph process provides a balance or tradeoff between meeting the traffic demand and preserving fairness. In providing a level of fairness, block 802 provides operation such that the traffic demand of a data flow is fully met if it is lower than the fair share of that data flow. For example, for any data flow that has outstanding traffic demand, $q_i$, less than or equal to the product of the data rate, $R_i$, that can be achieved by using one time slot in a TDMA frame and the actual fair share, $f_i$, for the data flow a number of slots sufficient to satisfy the traffic demand of the data flow are assigned (e.g., for any flow i that has $q_i \leq R_i f_i$, set $$\hat{x}_i = \frac{q_i}{R_i}$$

as the number of time slots to be assigned) at block 802.

The intra-graph resource allocation algorithm of embodiments, as executed over a maximal clique, operates to provide not only fairness but also a balance or tradeoff between meeting the traffic demand and preserving fairness. Accordingly, at block 803, for any data flow that has outstanding traffic demand, $q_i$, greater than the product of the data rate, $R_i$, that can be achieved by using one time slot in a TDMA frame and the actual fair share, $f_i$, for the data flow a number of slots is allocated to the data flow that provides a balance between fairness and meeting traffic demand (e.g., for any flow i that has $q_1 > R_i f_i$, set the number of time slots to be assigned based upon a balance of traffic demand and fairness).

In providing a balance between meeting traffic demand and preserving fairness, embodiments operate to minimize the total cost incurred from inadequate serving of traffic demand and allocating excessive time slots beyond a fair share. The cost functions associated with inadequate serving of traffic demand and allocating excessive time slots beyond a fair share can be quite general according to embodiments. Properties of cost functions of exemplary embodiments are set forth below to provide an understanding of particular cost functions as may be utilized according to the concepts herein.

The cost function, $u(z)$, induced by allocating z time slots above the fair share of a flow may be expressed as $u(z_i) = u(x_i - f_i)$ and $u(x_i - f_i) = 0, \forall x_i \leq f_i$. From the foregoing, it can be appreciated that $u(z)$ is strictly convex and is strictly increasing with z. Hence, the total cost induced by allocating excessive time slots above fair shares may be calculated as $\Sigma_i u(x_i - f_i) I_{x_i \geq f_i}$.

The cost function, $v(z)$, induced by inadequate serving of traffic demand of a flow may be expressed as $v(z_i) = v(q_i - R_i x_i)$ and $v(q_i - R_i x_i) = 0$, $$\forall \frac{q_i}{R_i} \leq x_i.$$

From the foregoing, it can be appreciated that $v(z)$ is strictly convex and is strictly increasing with z. Hence, the total cost induced by inadequate serving of traffic demand may be calculated as $$\sum_i v(q_i - R_i x_i) I_{\frac{q_i}{R_i} \geq x_i}.$$

To achieve the objectives of providing a balance between meeting traffic demand and preserving fairness for a maximal clique, embodiments solve the optimization problem with respect to the foregoing cost functions as follows:

$$\min_{x_1, x_2, \ldots, x_L} w_u \sum_{i=1}^{L} u(x_i - f_i) I_{x_i \geq f_i} + w_v \sum_{i=1}^{L} u(q_i - R_i x_i) I_{\frac{q_i}{R_i} \geq x_i} \quad (1)$$

The foregoing optimization is, according to embodiments, subject to several constraints. An optimization constraint, according to embodiments, provides that the portion of traffic demand within the fair share of a flow be should be fully met. Such an optimization constraint may be expressed as:

$$R_i x_i = q_i, \forall \frac{q_i}{R_i} \leq f_i \quad (2)$$

An additional or alternative optimization constraint, according to embodiments, provides that the actual assigned resource is no greater than $q_i$. This optimization constraint may be expressed as:

$$R_i f_i \leq R_i x_i \leq q_i, \forall \frac{q_i}{R_i} \geq f_i \quad (3)$$

Additionally or alternatively, an optimization constraint, according to embodiments, provides that the total number of slots assigned in a maximal clique is no larger than $s_n$, where $s_n$ is the total number of available time slots for MCSS-FCG $G_n$. This optimization constraint may be expressed as:

$$\sum_{i}^{L} x_i \leq s_n \quad (4)$$

The cost functions of embodiments are weighted by $w_u$ and $w_v$ to provide a desired balance between the cost functions as applied to resource allocation. The ratio between $w_u$ and $w_v$ may, for example, be determined from the weights given to the QoS and fairness cost functions, respectively.

The acceleration, $U_i(x)$, of the cost induced by allocating time slots beyond fair share for flow i may be represented as:

$$U_i(x) = w_u \frac{\partial u(x - f_i)}{\partial x} \quad (5)$$

Similarly, the deceleration of the cost induced by inadequately serving traffic demand for flow i can be expressed as:

$$V_i(x) = -w_v \frac{\partial v(q_i - R_i x)}{\partial x} \quad (6)$$

From the above it can be seen that $U_i$ increases with respect to x, since $$\frac{\partial U_i(x)}{\partial x} = w_u \frac{\partial^2 u(x - f_i)}{\partial x^2} > 0,$$

and that $V_i$ decreases with respect to x, since $$\frac{\partial V_i(x)}{\partial x} = -w_v \frac{\partial^2 v(q_i - R_i x)}{\partial x^2} < 0.$$

Hence, $V_i(x) - U_i(x)$ is an non-increasing function with respect to x.

The foregoing relationships may be utilized at block 803 of the illustrated embodiment to provide resource allocation balancing between the benefit of serving traffic demand and the risk of congestion induced by allocating resources above fair shares. For example, the following resource allocation algorithm may be implemented at block 803 according to embodiments herein.

For any flow i that has $q_1 > R_i f_i$
Calculate the maximum value and the minimum value of $V_i(x) - U_i(x)$. In fact, we have $$V_i(f_i) - U_i(f_i) \geq V_i(x) - U_i(x) \geq V_i\left(\frac{q_i}{R_i}\right) - U_i\left(\frac{q_i}{R_i}\right).$$

End for i.
Sort all maximum and minimum values in an increasing order. Denote the sequence by
$\phi_j, j = 1, \ldots, J$.
For $j = 1, 2, \ldots, J$ Calculate the $x_i$ as follows:

$$x_i = \begin{cases} f_1 & \phi_j \geq V_i(f_i) - U_i(f_i) \\ \dfrac{q_i}{R_i} & \phi_j \leq V_i\left(\dfrac{q_i}{R_i}\right) - U_i\left(\dfrac{q_i}{R_i}\right) \\ x \mid V_i(x) - U_i(x) = \phi_j & o.w. \end{cases}$$

If $\sum_i^L x_i \leq s_n$

Set $\phi_H = \phi_j$ and $\phi_L = \phi_{j-1}$.

Break.

End if.

End for $j$.

For all flow $\omega = \{i\}$ that have $\phi_L \leq V_i(x_i) - U_i(x_i) \leq \phi_H$, execute only one of the following two:

Solve the equation array $V_i(x_i) - U_i(x_i) = V_j(x_j) - U_j(x_j)$, $i \in \Omega$ and $$\sum_{l=1}^{L} x_l = s_n$$

is the total number of flows.

Or use the bisection method to find $\hat{\phi} \in [\phi_L, \phi_H]$ so that we have $$\sum_{l=1}^{L} x_l = s_n, L$$

by setting $x_i = \{x \mid V_i(x) - U_i(x) = \phi\}$.

Set $\hat{x}_i = x_i$.

It should be appreciated that choosing to solve the equation array above gives a precise optimal solution. However, choosing to use the bisection method above results in an approximate optimal solution with possibly less computation time.

The foregoing resource allocation algorithm operates in the following manner. When the deceleration of the cost for inadequately serving traffic demand is less than the acceleration of the cost in allocating extra time slots beyond fair share, the resource allocation assignment provided by the algorithm moves towards the fair share. When the deceleration of the cost for inadequately serving traffic demand is more than the acceleration of the cost in allocating extra time slots beyond fair share, the resource allocation assignment provided by the algorithm moves towards meeting all its traffic demand. According to embodiments of the foregoing algorithm, the amount of slots assigned to a data flow is set to a particular value between the fair share and the traffic demand in accordance with the resource assignment balancing these two conflicting costs.

At block 803 of the illustrated embodiment, a determination is made as to whether intra-graph resource allocation processing in accordance with blocks 802 and 803 has been performed with respect to all maximal cliques in the underlying MCSS-FCG. If not, processing according to the illustrated embodiment returns to block 801 for selection of a maximal clique of the MCSS-FCG for resource allocation processing. However, if so, the intra-graph processing of the illustrated embodiment ends.

Embodiments of resource allocation algorithms, such as that of the exemplary embodiment shown above, are executed in a distributed fashion. Such distributed execution of resource allocation algorithms may be executed by the source (e.g., source network node) and/or the destination (e.g., destination network node) of every data flow. The resource assignment results may be sub-optimal when executed in a distributed fashion. Accordingly, for a source or destination of a data flow to obtain all maximal cliques that the data flow resides in, embodiments implementing distributed execution of resource allocation algorithms operate such that the source and/or destination of a data flow advertise a list of its contending data flows to its one hop neighbor nodes. Such communication of contending data flow information may involve an information propagation scope that spans over 3 hops.

The following shows that the exemplary algorithms described with respect to processing blocks 802 and 803 above solve the optimization problem set forth in equation (1). For any functions u(z) and v(z) that possess the general properties described above, the optimization problem of equation (1) has the following optimal solutions:

$$\hat{x}_i = \begin{cases} \dfrac{q_i}{R_i} & \text{if } q_i \leq R_i f_i \\ f_i & \text{if } q_i > R_i f_i \text{ and } \gamma > V_i(f_i) - U_i(f_i) \\ \in \left(f_i, \dfrac{q_i}{R_i}\right) & \text{if } q_i > R_i f_i \text{ and } \gamma = V_i(\hat{x}_i) - U_i(\hat{x}_i) \\ \dfrac{q_i}{R_i} & \text{if } q_i > R_i f_i \text{ and } \gamma < V_i\left(\dfrac{q_i}{R_i}\right) - U_i\left(\dfrac{q_i}{R_i}\right) \end{cases} \quad (7)$$

where $\gamma > 0$ is selected so that $$\sum_i^L x_i \leq s_n.$$

Solving for $x_i$ in equation (2) above provides $$\hat{x}_i = \frac{q_i}{R_i},$$

$\forall q_i \leq R_i f_i$. This indicates that the optimization problem need only be solved for $q_i > R_i f_i$. Hence, identity functions can be subsequently removed from the objective function and the problem is reduced to the following:

$$\min_{x_1, x_2, \ldots, x_L} w_u \sum_{i=1}^{L} u(x_i - f_i) + w_v \sum_{i=1}^{L} v(q_i - R_i x_i) \quad (8)$$

$$\text{s.t.} \begin{cases} f_i \leq x_i \leq \dfrac{q_i}{R_i} \\ \sum_{i=1}^{L} x_i \leq s_n - \sum_j \dfrac{q_j}{R_j}, \; q_j \leq R_j f_j \end{cases} \quad (9)$$

Let $$Q_t = \sum_j \frac{q_j}{R_j},$$

$q_j \leq R_j f_j$. $Q_t$ represents the total number of slots assigned to those data flows whose traffic demand is less than its fair share.

The Karush-Kuhn-Tucker conditions provides the following:

$$\begin{cases} \dfrac{\partial\left(w_u \sum_{i=1}^{L} u(\hat{x}_i - f_i) + w_v \sum_{i=1}^{L} v(q_i - R_i \hat{x}_i)\right)}{\partial \hat{x}_i} + \\ \dfrac{\partial \beta_i(R_i \hat{x}_i - q_i)}{\partial \hat{x}_i} + \dfrac{\partial \sigma_i(f_i - \hat{x}_i)}{\partial \hat{x}_i} + \dfrac{\partial \lambda\left(\sum_{i=1}^{L}\hat{x}_i - (s_n - Q_t)\right)}{\partial \hat{x}_i} = 0 \\ \beta_i(R_i \hat{x}_i - q_i) = 0 \\ \sigma_i(f_i - \hat{x}_i) = 0 \\ \gamma\left(\sum_{i=1}^{L} \hat{x}_i - (s_n - Q_t)\right) = 0 \\ \beta_i \geq 0, \sigma_i \geq 0, \gamma \geq 0 \end{cases}$$

$$\Leftrightarrow \begin{cases} U_i(\hat{x}_i) - V_i(\hat{x}_i) + R_i\beta_i - \sigma_i + \gamma = 0 \\ \beta_i(R_i \hat{x}_i - q_i) = 0 \\ \sigma_i(f_i - \hat{x}_i) = 0 \\ \gamma\left(\sum_{i=1}^{L}\hat{x}_i - (s_n - Q_t)\right) = 0 \\ \beta_i \geq 0, \sigma_i \geq 0, \gamma \geq 0 \end{cases}$$

For the case $\sigma_i > 0$, $\hat{x}_i = f_i$ with the following subcases.
For $\beta_i = 0$, $$\hat{x}_i < \frac{q_i}{R_i},$$

we have $U_i(f_i) - H_i(f_i) + \gamma = \sigma_i > 0$. Hence, $\gamma > H_i(f_i) - U_i(f_i)$.
For $\beta_i > 0$, we have $$\hat{x}_i = \frac{q_i}{R_i}.$$

Since we have $q_i > R_i f_i$, and $\hat{x}_i = f_i$ is contradictory to $$\hat{x}_i = \frac{q_i}{R_i},$$

this case is abandoned. For the case that $\sigma_i = 0$, $\hat{x}_i > f_i$, the following subcases apply.
For $\beta_i > 0$, we have $$\hat{x}_i = \frac{q_i}{R_i} \text{ and } U_i\left(\frac{q_i}{R_i}\right) - V_i\left(\frac{q_i}{R_i}\right) + \gamma = -R_i\beta_i < 0.$$

Hence, we have $$\gamma < V_i\left(\frac{q_i}{R_i}\right) - U_i\left(\frac{q_i}{R_i}\right).$$

For $\beta_i = 0$, $$\hat{x}_i < \frac{q_i}{R_i},$$

we have $U_i(\hat{x}_i) - V_i(\hat{x}_i) + \gamma = 0$. Hence, $\gamma = V_i(\hat{x}_i) - U_i(\hat{x}_i)$ and $$f_i \leq \hat{x}_i \leq \frac{q_i}{R_i}.$$

Assuming that $\hat{\phi}$ results at the end of the bisection method set forth above. Set $\gamma = \hat{\phi}$. For any data flow k where $\gamma > V_i(f_i) -$ $U_i(f_i)$, $x_i = f_i$ is set in the iteration process. For any data flow k where $V_k(f_k) - U_k(f_k) \geq \gamma$, the algorithm has already set $$\hat{x}_k = \frac{q_k}{R_k}, \text{ if } V_k\left(\frac{q_k}{R_k}\right) - U_j\left(\frac{q_k}{R_k}\right) > \gamma$$

or have $$f_k \leq \hat{x}_k \leq \frac{q_k}{R_k},$$

if there exists a solution as $V_k(\hat{x}_k) - U_j(\hat{x}_k) = \gamma$.
Since the iteration process terminates, the assigned value $\{\hat{x}_i\}$ must have $$\sum_{i=1}^{L} x_i = s_n.$$

From the foregoing it can be appreciated that the exemplary algorithm discussed above achieves the optimal solution for the optimization problem set forth in equation (1).

Operation in accordance with embodiments of the flow diagrams of FIGS. 6-8 above gives resource assignments to all new arrival data flows. An assignment may exhaust all slots and leave inadequate amount of slots for accommodating future data flows. Thus, assignments of some current data flows may be deemed temporary or retractable according to embodiments. In operation according to such embodiments, when there are new data flows generated, some of the current data flows may join the new data flows for another execution of the resource allocation algorithm, which will subsequently re-balance the serving of the traffic demand and the fairness.

Numerical results show that resource allocation algorithms in accordance with embodiments herein performs significantly better than other slot allocation algorithms, such as DRAND. For example, the performance of the foregoing exemplary resource allocation algorithms has been demonstrated by carrying out numerical experiments over several network scenarios using a simulator written in the Ruby programming language. The inputs of the simulation included data flows and their traffic demands, MCSS-FCGs and the mapping between data flows and MCSS-FCGs. Hence, the simulation program did not need to implement control message exchange protocols and graph computation algorithms that prepare the input parameters for resource allocation. The results provided by the simulation were compared to those obtained from DRAND. The resource allocation algorithm provides demand aware fair resource assignment and thus is referred to as "DAF" in the following discussion.

It should be appreciated that the function that represents the cost induced by allocating extra time slots above the fair share, u(z), can take different forms for different levels of concerns in fairness or congestion. Embodiments, however, constrain this function to providing resource allocation algorithms which fully meet the portion of traffic demand within the fair share of a data flow and jointly minimize the cost associated with inadequate serving of traffic demand and the cost associated with allocating excessive amount of time slots above fair shares. In the simulation, u(z)=z, z≥0 was set to u(x)=x-f, x≥f. Hence, $U_i(x) = w_u$.

It should also be appreciated that the function that represents the cost induced by inadequately serving traffic demand, v(z), can take different forms for different levels of concerns in QoS. In the simulation, $$v(z) = \frac{1}{q-z} - \frac{1}{q},$$

$0 \le z \le q$ was set to $$v(x) = \frac{1}{Rx} - \frac{1}{q}, 0 \le x \le \frac{q}{R}.$$

Under this setting, the cost induced by inadequately serving traffic demand increases drastically when more traffic demand is not served. Hence, $$V(x) = \frac{w_v}{Rx^2}.$$

The weights for the above cost functions were set so that their acceleration levels are about the same. Hence, assuming a typical flow assignment requires 50 slots among 256 slots that could be available in maximum, the weights were set as $$\frac{w_u}{w_v} = \frac{1}{2500R}.$$

For the purpose of simplifying the concepts presented, a common data rate R=1 bit per slot for all one hop flows is assumed.

To target a relative low computational complexity, the fair share for a flow i, in a MCSS-FCG, $G_n$, was set equal to $$\frac{s_n}{d_i^n},$$

where $d_i^n$ is the maximum degree of all maximal cliques flow i resides within $G_n$, $s_n$ is the number of time slots available in $G_n$.

Figure 9A:
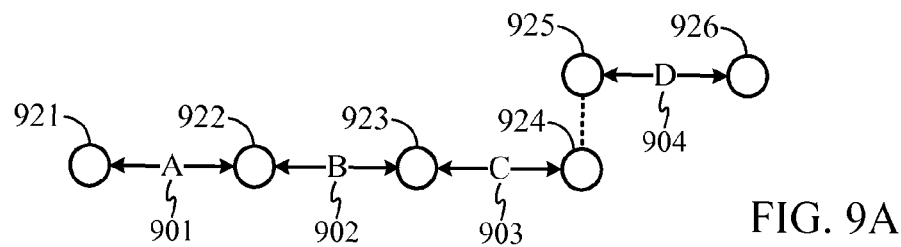
FIG. 9A illustrates a simple network scenario, including network nodes and data flows, with a relatively low flow contention level.

A simple network scenario, as illustrated in FIG. 9A including network nodes 921-926 and data flows 901-904, with a relatively low flow contention level was studied. In this setup, fairness is a lesser issue. Traffic demand can be well served by the particular order that the inter-graph process executes over different MCSS-FCGs.

Figure 9B:
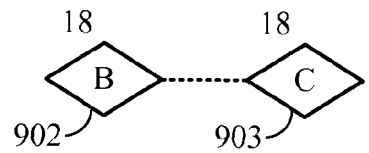
FIGS. 9B-9D show flow contention graphs, showing data flows and their associated contentions, mapped from the data flows of FIG. 9A.
Figure 9C:
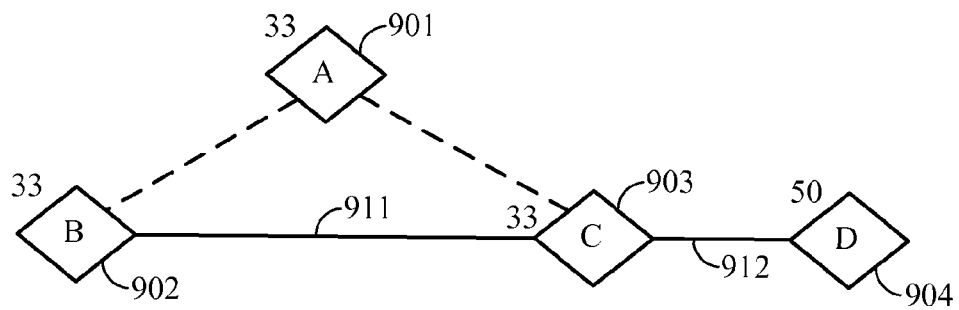
Figure 9D:
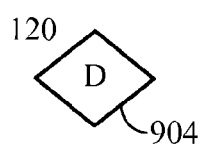

As shown in FIG. 9A, there are 4 one hop new data flow arrivals (data flows 901-904). These data flows may be mapped into various flow contention graphs, showing multiple data flows and their associated contentions, as seen in FIGS. 9B-9D. Each data flow has an opportunity to utilize some slots. For example, data flow 903 can utilize 136 slots in total, however is contending with many other data flows (contention indicators 911 and 912). Data flow 904 has a large number of slots it can utilize without facing contentions from any other data flows (FIG. 9D). Two traffic demand patterns were simulated, referred to herein as pattern 1 and pattern 2, wherein R=1 bit per slot was set in the simulations as discussed above. Pattern 2 has slightly higher traffic demand than pattern 1. The results under pattern 1 are shown in Table I below. The results under pattern 2 are shown in Table II below.

TABLE I

TIME SLOT ASSIGNMENT UNDER PATTERN 1 AND SCENARIO 1

| Flow ID | Demand (slots) | DAF (slots) | DRAND (slots) |
|---|---|---|---|
| #1 | 35 | 35 | 28 |
| #2 | 70 | 52 | 46 |
| #3 | 35 | 35 | 35 |
| #4 | 100 | 100 | 100 |

TABLE II

TIME SLOT ASSIGNMENT UNDER PATTERN 2 AND SCENARIO 1

| Flow ID | Demand (slots) | DAF (slots) | DRAND (slots) |
|---|---|---|---|
| #1 | 50 | 36 | 24 |
| #2 | 50 | 50 | 42 |
| #3 | 50 | 50 | 46 |
| #4 | 100 | 100 | 100 |

The slot utilization in each MCSS-FCG under pattern 1 is shown in Table III below.

TABLE III

ASSIGNMENT COMPOSITION UNDER PATTERN 1 AND SCENARIO 1

| Flow ID | MCSS-FCG #1 | MCSS-FCG #2 | MCSS-FCG #3 |
|---|---|---|---|
| #1 |  | 35 |  |
| #2 | 18 | 35 |  |
| #3 | 18 | 17 |  |
| #4 |  |  | 100 |

The following observations can be drawn from the results of pattern 1. The advantage of the inter-graph process can be clearly seen. For example, data flow 904 is assigned as many slots as possible in $G_3$ due to the effect of the inter-graph process, so that its high demand does not interfere with other flows.

Traffic demands of data flows 901 and 903 are completely served due to their relative low traffic demand levels. The resource assignment for data flow 1 in $G_2$ is slightly above its fair share (33 slots) since assignment for data flows 902 and 903 in $G_1$ has relieved the contention in $G_2$. Time slots of $G_2$ are not all utilized, since a data flow of embodiments only accepts the minimum of all assignments it receives from all maximal cliques within a graph.

The slot utilization in each MCSS-FCG under pattern 2 is shown in Table IV below

TABLE IV

ASSIGNMENT COMPOSITION UNDER PATTERN 2 AND SCENARIO 1

| Flow ID | MCSS-FCG #1 | MCSS-FCG #2 | MCSS-FCG #3 |
|---|---|---|---|
| #1 |  | 36 |  |
| #2 | 18 | 32 |  |
| #3 | 18 | 32 |  |
| #4 |  |  | 100 |

The following observations can be drawn from the results of pattern 2. Traffic demand of data flow 901 cannot be fully met due to its high level of traffic demand in the only MCSS-FCG, $G_2$, it resides in. Nevertheless, its assignment is above its fair share. Data flows 902 and 903 are in a topologically similar position, as the degrees of their maximal cliques are equal in $G_1$ and $G_2$ and they contend with similar set of data flows. When traffic demand levels of data flows 902 and 903 become more even compared to theirs in pattern 1, their traffic demand can be fully met.

Figure 10A:
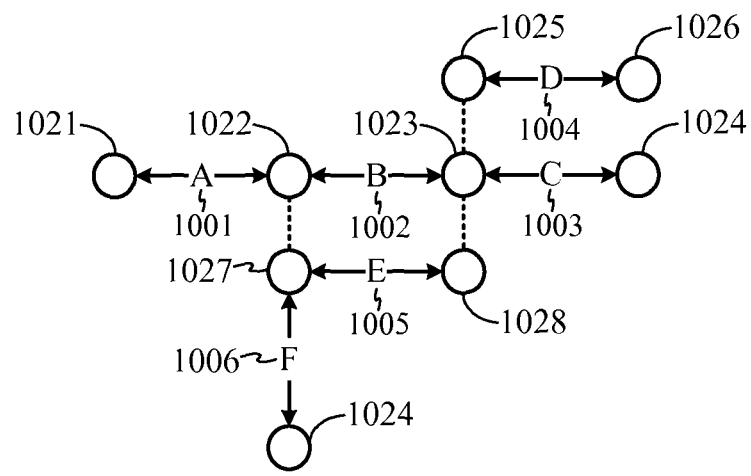
FIG. 10A illustrates a more complex network scenario, including network nodes and data flows, with a higher flow contention level.

A more complex network scenario, as illustrated in FIG. 10A including network nodes 1021-1029 and data flows 1001-1006, with a higher flow contention level was studied. In this example, more fairness problems are to be addressed by the intra-graph process and algorithm.

Figure 10B:
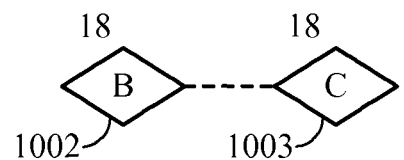
FIGS. 10B-10D show flow contention graphs, showing data flows and their associated contentions, mapped from the data flows of FIG. 10A.
Figure 10C:
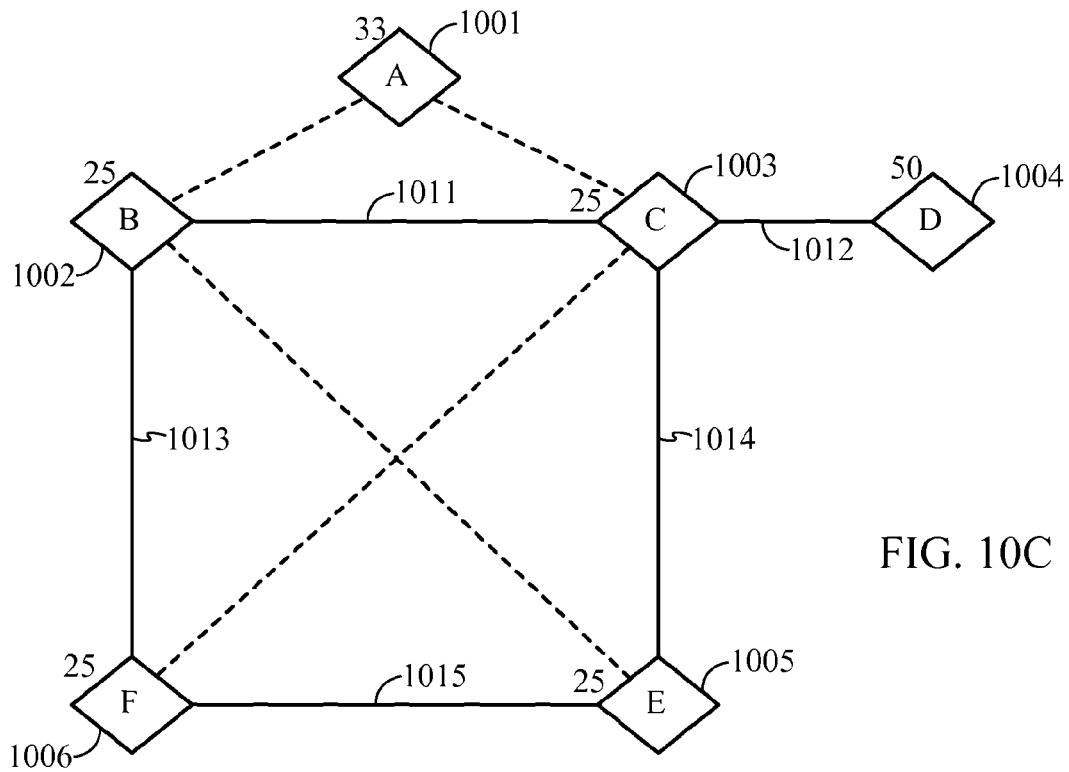
Figure 10D:
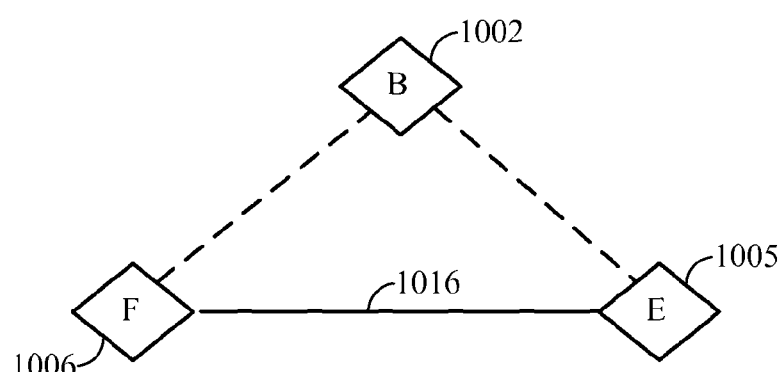

As seen in FIG. 10A, there are 6 one hop new data flow arrivals. These data flows may be mapped into various flow contention graphs, showing multiple data flows and their associated contentions, as seen in FIGS. 10B-10D. Data flows 1002, 1003, 1005 and 1006 are in a high contention level among each other on different various maximal common slots, that have corresponding MCSS-FCGS as $G_1$, $G_2$, and $G_3$ (contention indicators 1011-1016). Two traffic demand patterns are simulated, referred to herein as pattern 1 and pattern 2, wherein R=1 bit per slot was set in the simulations as discussed above. Pattern 2 has slightly higher traffic demand than pattern 1. The results under pattern 1 are shown in Table V below. The results under pattern 2 are shown in Table VI below.

TABLE V

TIME SLOT ASSIGNMENT UNDER PATTERN 1 AND SCENARIO 2

| Flow ID | Demand (slots) | DAF (slots) | DRAND (slots) |
|---------|----------------|-------------|---------------|
| #1 | 50 | 50 | 17 |
| #2 | 50 | 50 | 50 |
| #3 | 50 | 50 | 35 |
| #4 | 50 | 50 | 16 |
| #5 | 50 | 50 | 50 |
| #6 | 50 | 50 | 50 |

TABLE VI

TIME SLOT ASSIGNMENT UNDER PATTERN 2 AND SCENARIO 2

| Flow ID | Demand (slots) | DAF (slots) | DRAND (slots) |
|---------|----------------|-------------|---------------|
| #1 | 60 | 42 | 17 |
| #2 | 60 | 60 | 60 |
| #3 | 60 | 60 | 35 |
| #4 | 60 | 50 | 16 |
| #5 | 60 | 60 | 60 |
| #6 | 60 | 60 | 60 |

The slot utilization in each MCSS-FCG under pattern 1 is shown in Table VII below.

TABLE VII

ASSIGNMENT COMPOSITION UNDER PATTERN 2 AND SCENARIO 1

| Flow ID | MCSS-FCG #1 | MCSS-FCG #2 | MCSS-FCG #3 |
|---------|-------------|-------------|-------------|
| #1 |  | 50 |  |
| #2 | 18 |  | 32 |
| #3 | 18 | 32 |  |
| #4 |  | 50 |  |
| #5 |  | 10 | 40 |
| #6 |  | 10 | 40 |

The following observations can be drawn from the results of pattern 1. All traffic demand requirements are satisfied. This is due to the fact that $G_1$ and then $G_3$ are able to sequentially provide large amount of slots for data flows 1002, 1005, and 1006, which leads to a significantly lowered traffic demand in a highly contended MCSS-FCG $G_2$. For one instance, data flow 1002 does not need to be assigned any time slots in $G_2$.

The time slot utilization in each MCSS-FCG under pattern 2 is shown in Table VIII below.

TABLE VIII

TIME SLOT ASSIGNMENT UNDER PATTERN 2 AND SCENARIO 2

| Flow ID | Demand (slots) | DAF (slots) | DRAND (slots) |
|---------|----------------|-------------|---------------|
| #1 |  | 42 |  |
| #2 | 18 | 2 | 40 |
| #3 | 18 | 42 |  |
| #4 |  | 50 |  |
| #5 |  | 20 | 40 |
| #6 |  | 20 | 40 |

The following observations can be drawn from the results of pattern 2. The traffic demand for data flow 1 cannot be fully accommodated in $G_2$, since its contending data flow, data flow 1003, has increased its demand. Nevertheless, the assignment in $G_2$ for data flow 1001 is still above its fair share. The tradeoff between meeting traffic demand and maintaining fairness thus reducing potential congestion is addressed by the algorithm. For example, the time slots of $G_2$ are not all utilized, although data flow 1001 still has traffic demand to meet. This is because many data flows have been allocated slots beyond their fair shares.

From the above, it can be seen that a demand-aware fair resource allocation algorithm is provided according to embodiments herein such as may be utilized to allocate time slots in TDMA-based multi-hop wireless networks with objectives of both meeting traffic demand as much as possible while enforcing a predefined fairness level so that the risk of potential congestion can be reduced. DAF algorithms of embodiments project new network data flow arrivals onto multiple maximal common slot set based flow contention graphs and then execute an intra-graph resource allocation algorithm over contention graphs in a selected order. The execution order of embodiments strives to reduce the flow contention as much as possible before the intra-graph algorithm starts allocating slots over each particular graph. An intra-graph algorithm of embodiments operates to minimize, over a maximal clique, a generally defined cost function induced jointly by inadequately serving traffic demand and serving beyond fair shares.

Although embodiments have been described herein with respect to allocation of time slot resources, it should be appreciated that the concepts herein may be applied to other network resources. For example, embodiments may be implemented with respect to allocation of network resources such as frequency slots (e.g., carriers, sub-carriers, etc.).

The methodologies described herein may be implemented by various components depending upon the application. For example, these methodologies may be implemented in hardware, firmware, software, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read only memory (ROM), electrically erasable programmable read only memory (EEPROM), compact disk read only memory (CD-ROM) or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 11:
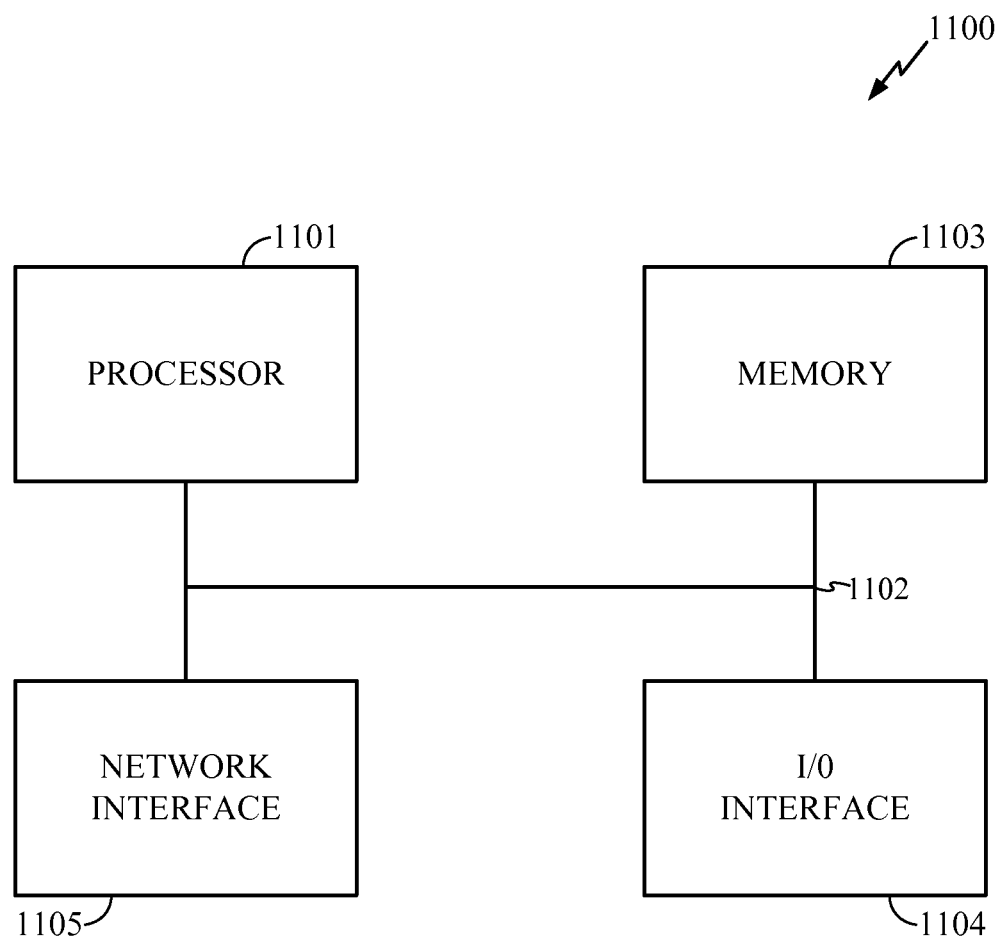
FIG. 11 shows a processor based system adapted according to embodiments of the disclosure.

FIG. 11 illustrates processor based system 1100 adapted in accordance with the present disclosure to provide operation as described herein under control of the aforementioned code segments. Processor based system 1100 may have a network node, such as any of network nodes 221-229 of FIG. 2B, network nodes 921-924 of FIG. 9A, and/or network nodes 1021-1026 of FIG. 10A, or a system coupled to one or more network node. Processor 1101 is coupled to system bus 1102. Processor 1101 may comprise a general purpose central processing unit (CPU), such as PENTIUM processor available from Intel Corporation, or a special purpose processor, such as an application specific integrated circuit (ASIC), programmable gate array (PGA), etc. However, the present disclosure is not restricted by the architecture of processor 1101 as long as processor 1101 supports the inventive operations as described herein. Bus 1102 is coupled to memory 1103, which may comprise any suitable computer readable medium such as RAM, ROM, flash memory, optical memory, magnetic memory, etc. Memory 1103 stores user data, system data, resource constraint information, program code, etc. to facilitate operation as described herein. Bus 1102 is also coupled to input/output (I/O) interface 1104 and network interface 1105. I/O interface 1104 provides interfacing of various peripherals, components, devices, etc., such as may comprise keyboards, keypads, pointing devices, display devices, etc. Thus, I/O interface 1104 may comprise a plurality of individual interfaces, interface protocols, etc. Network interface 1105 provides interfacing with one or more network links, such as may comprise one or more wireline links, wireless links, fiber optic links, etc. Thus network interface 1105 may comprise a single network interface or a plurality of network interfaces operating in accordance with one or more network protocols.

Although embodiments of the present disclosure and their advantages have been described in detail, it should be understood that various changes, substitutions and alterations can be made herein without departing from the spirit and scope as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
sending information regarding a new data flow and information regarding contending data flows to one or more neighboring nodes from a source node or a destination node, the information regarding the new data flow including an available resource set for the new data flow; and
determining a maximal common slot set based flow contention graph (MCSS-FCG) for the new network data flow using the information regarding the new data flow and the information regarding contending data flows, wherein the MCSS-FCG comprises a flow contention graph with respect to a maximal common slot set which is available to all data flows in the MCSS-FCG.

2. The method of claim 1, further comprising decomposing the MCSS-FCG into maximal cliques of data flows.

3. The method of claim 1, wherein the source node, the destination node, and the one or more neighboring nodes together form a time division multiple access (TDMA) based communication network and the available resource set comprises TDMA time slots.

4. The method of claim 3, further comprising:
defining a structure for the TDMA network, the structure having a maximal common time slot set and an associated MCSS-FCG; and
decomposing all available time slots of the TDMA network into a plurality of respective maximal common time slot sets, each of the plurality of respective maximal common time slot sets being associated with a respective MCSS-FCG.

5. The method of claim 1, further comprising:
receiving a notification from one of the one or more neighboring nodes that the new data flow belongs to the one of the one or more neighboring nodes.

6. The method of claim 1, further comprising:
receiving a notification from one of the one or more neighboring nodes that the new data flow contends with an existing data flow of the one or more of the neighboring nodes.

7. An apparatus, comprising:
a processor;
memory in electronic communication with the processor; and
instructions stored in the memory, the instructions being executable by the processor to:
send information regarding a new data flow and information regarding contending data flows to one or more neighboring nodes from a source node or a destination node, the information regarding the new data flow including an available resource set for the new data flow; and determine a maximal common slot set based flow contention graph (MCSS-FCG) for the new network data flow using the information regarding the new data flow and the information regarding contending data flows, wherein the MCSS-FCG comprises a flow contention graph with respect to a maximal common slot set which is available to all data flows in the MCSS-FCG.

8. The apparatus of claim 7, wherein the memory further comprises instructions being executable by the processor to:
decompose the MCSS-FCG into maximal cliques of data flows.

9. The apparatus of claim 7, wherein the source node, the destination node, and the one or more neighboring nodes together form a time division multiple access (TDMA) based communication network and the available resource set comprises TDMA time slots.

10. The apparatus of claim 9, wherein the memory further comprises instructions being executable by the processor to:
define a structure for the TDMA network, the structure having a maximal common time slot set and an associated MCSS-FCG; and
decompose all available time slots of the TDMA network into a plurality of respective maximal common time slot sets, each of the plurality of respective maximal common time slot sets being associated with a respective MCSS-FCG.

11. The apparatus of claim 7, wherein the memory further comprises instructions being executable by the processor to:
receive a notification from one of the one or more neighboring nodes that the new data flow belongs to the one of the one or more neighboring nodes.

12. The apparatus of claim 7, wherein the memory further comprises instructions being executable by the processor to:
receive a notification from one of the one or more neighboring nodes that the new data flow contends with an existing data flow of the one or more of the neighboring nodes.

13. A non-transitory computer-readable medium storing code comprising instructions executable by a processor to:
send information regarding a new data flow and information regarding contending data flows to one or more neighboring nodes from a source node or a destination node, the information regarding the new data flow including an available resource set for the new data flow; and
determine a maximal common slot set based flow contention graph (MCSS-FCG) for the new network data flow using the information regarding the new data flow and the information regarding contending data flows, wherein the MCSS-FCG comprises a flow contention graph with respect to a maximal common slot set which is available to all data flows in the MCSS-FCG.

14. The non-transitory computer-readable medium of claim 13, wherein the instructions are executable by the processor to:
decompose the MCSS-FCG into maximal cliques of data flows.

15. The non-transitory computer-readable medium of claim 13, wherein the source node, the destination node, and the one or more neighboring nodes together form a time division multiple access (TDMA) based communication network and the available resource set comprises TDMA time slots.

16. The non-transitory computer-readable medium of claim 15, wherein the instructions are executable by the processor to:
define a structure for the TDMA network, the structure having a maximal common time slot set and an associated MCSS-FCG; and
decompose all available time slots of the TDMA network into a plurality of respective maximal common time slot sets, each of the plurality of respective maximal common time slot sets being associated with a respective MCSS-FCG.

17. The non-transitory computer-readable medium of claim 13, wherein the instructions are executable by the processor to:
receive a notification from one of the one or more neighboring nodes that the new data flow belongs to the one of the one or more neighboring nodes.

18. The non-transitory computer-readable medium of claim 13, wherein the instructions are executable by the processor to:
receive a notification from one of the one or more neighboring nodes that the new data flow contends with an existing data flow of the one or more of the neighboring nodes.

* * * * *